(12) United States Patent
Wang et al.

(10) Patent No.: US 12,177,821 B2
(45) Date of Patent: Dec. 24, 2024

(54) DYNAMIC CARRIER SUBBAND OPERATION FOR ACTIVE COORDINATION SETS

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 473 days.

(21) Appl. No.: 17/292,641

(22) PCT Filed: Jan. 22, 2020

(86) PCT No.: PCT/US2020/014638
§ 371 (c)(1),
(2) Date: May 10, 2021

(87) PCT Pub. No.: WO2020/159773
PCT Pub. Date: Aug. 6, 2020

(65) Prior Publication Data
US 2022/0007363 A1     Jan. 6, 2022

Related U.S. Application Data

(60) Provisional application No. 62/797,885, filed on Jan. 28, 2019.

(51) Int. Cl.
*H04W 72/0453* (2023.01)
*H04W 36/00* (2009.01)
(Continued)

(52) U.S. Cl.
CPC ... *H04W 72/0453* (2013.01); *H04W 36/0085* (2018.08); *H04W 76/15* (2018.02);
(Continued)

(58) Field of Classification Search
CPC ......... H04W 72/0453; H04W 36/0069; H04W 36/0085; H04W 76/15; H04W 88/08; H04W 92/20; H04B 7/024
See application file for complete search history.

(56) References Cited

U.S. PATENT DOCUMENTS 6,038,448 A      3/2000   Chheda et al.
6,665,521 B1    12/2003   Gorday et al.
(Continued)

FOREIGN PATENT DOCUMENTS

CN      101764634        6/2010
CN      101867451       10/2010
(Continued)

OTHER PUBLICATIONS

"Foreign Office Action", IN Application No. 202147024718, Feb. 28, 2022, 5 pages.
(Continued)

*Primary Examiner* — Jung H Park
(74) *Attorney, Agent, or Firm* — Colby Nipper PLLC

(57) ABSTRACT

This document describes methods, devices, systems, and means for dynamic carrier subband operation for active coordination sets. A master base station selects a first carrier subband associated with a first Active Coordination Set (ACS) for joint communication with a user equipment (UE), coordinates the joint communication for the UE with other base stations in the first ACS, and monitors the joint communication with the UE. Based on the monitoring of the joint communication, the master base station selects a second carrier subband that is associated with a second ACS for the joint communication with the UE and coordinates with base stations associated with the second ACS to jointly communicate with the UE using the second carrier subband.

21 Claims, 10 Drawing Sheets

(51) Int. Cl.
*H04W 76/15* (2018.01)
*H04W 88/08* (2009.01)
*H04W 92/20* (2009.01)

(52) U.S. Cl.
CPC ...... *H04W 36/00695* (2023.05); *H04W 88/08* (2013.01); *H04W 92/20* (2013.01)

(56) References Cited

U.S. PATENT DOCUMENTS

| | | | |
|---|---|---|---|
| 6,898,430 | B1 | 5/2005 | Liberti et al. |
| 8,023,463 | B2 | 9/2011 | Dick et al. |
| 8,315,629 | B2 | 11/2012 | Pamp et al. |
| 8,483,184 | B2 | 7/2013 | Yokoyama et al. |
| 8,665,806 | B2 | 3/2014 | Wang et al. |
| 8,706,156 | B2 | 4/2014 | Han et al. |
| 8,989,125 | B1 | 3/2015 | Marupaduga et al. |
| 9,008,678 | B2 | 4/2015 | Schoenerstedt |
| 9,100,095 | B2 | 8/2015 | Mantri |
| 9,210,550 | B2 | 12/2015 | Koc et al. |
| 9,253,783 | B2 | 2/2016 | Wang et al. |
| 9,344,159 | B2 | 5/2016 | Zhuang |
| 9,374,772 | B2 | 6/2016 | Daoud |
| 9,380,533 | B2 | 6/2016 | Chung et al. |
| 9,674,863 | B2 | 6/2017 | Cheng et al. |
| 9,743,329 | B2 | 8/2017 | Xiao et al. |
| 9,780,842 | B2 | 10/2017 | Boudreau et al. |
| 9,941,939 | B2 | 4/2018 | Parl et al. |
| 9,985,750 | B2 | 5/2018 | Maaref et al. |
| 10,045,376 | B2 | 8/2018 | Yang et al. |
| 10,218,422 | B2 | 2/2019 | Raghavan et al. |
| 10,412,691 | B1 | 9/2019 | Marupaduga et al. |
| 10,476,577 | B1 | 11/2019 | Wang et al. |
| 10,834,645 | B2 | 11/2020 | Wang et al. |
| 10,893,572 | B2 | 1/2021 | Wang et al. |
| 11,224,081 | B2 | 1/2022 | Wang et al. |
| 11,375,527 | B1 | 6/2022 | Eyuboglu et al. |
| 11,804,877 | B2 | 10/2023 | Wang et al. |
| 12,114,394 | B2 | 10/2024 | Wang et al. |
| 2003/0002460 | A1 | 1/2003 | English |
| 2004/0203973 | A1 | 10/2004 | Khan |
| 2006/0013185 | A1 | 1/2006 | Seo et al. |
| 2006/0116156 | A1 | 6/2006 | Haseba et al. |
| 2006/0128312 | A1 | 6/2006 | Declerck et al. |
| 2006/0203731 | A1 | 9/2006 | Tiedemann et al. |
| 2010/0027487 | A1 | 2/2010 | Ihm et al. |
| 2010/0103983 | A1 | 4/2010 | Wang et al. |
| 2010/0142462 | A1 | 6/2010 | Wang et al. |
| 2010/0173660 | A1 | 7/2010 | Liu et al. |
| 2010/0210246 | A1* | 8/2010 | Yang .................. H04W 24/02 455/67.11 |
| 2011/0080893 | A1 | 4/2011 | Fong et al. |
| 2011/0096751 | A1 | 4/2011 | Ma et al. |
| 2011/0124294 | A1 | 5/2011 | Dwyer et al. |
| 2011/0158117 | A1 | 6/2011 | Ho et al. |
| 2011/0281585 | A1 | 11/2011 | Kwon et al. |
| 2012/0033571 | A1 | 2/2012 | Shimezawa et al. |
| 2012/0083309 | A1 | 4/2012 | Kwon et al. |
| 2012/0087273 | A1 | 4/2012 | Koo et al. |
| 2012/0120821 | A1 | 5/2012 | Kazmi et al. |
| 2012/0157139 | A1 | 6/2012 | Noh et al. |
| 2012/0178462 | A1 | 7/2012 | Kim |
| 2012/0218968 | A1 | 8/2012 | Kim et al. |
| 2012/0264443 | A1 | 10/2012 | Ng et al. |
| 2013/0034136 | A1 | 2/2013 | Park et al. |
| 2013/0053045 | A1 | 2/2013 | Chuang |
| 2013/0053079 | A1 | 2/2013 | Kwun et al. |
| 2013/0089058 | A1 | 4/2013 | Yang et al. |
| 2013/0107848 | A1 | 5/2013 | Kang et al. |
| 2013/0130684 | A1 | 5/2013 | Gomes et al. |
| 2013/0150106 | A1 | 6/2013 | Bucknell et al. |
| 2013/0182628 | A1 | 7/2013 | Gholmieh et al. |
| 2013/0225184 | A1 | 8/2013 | Liu et al. |
| 2013/0242787 | A1 | 9/2013 | Sun et al. |
| 2013/0244682 | A1 | 9/2013 | Schoenerstedt |
| 2014/0010131 | A1 | 1/2014 | Gaal et al. |
| 2014/0112184 | A1 | 4/2014 | Chai |
| 2014/0127991 | A1 | 5/2014 | Lim et al. |
| 2014/0148168 | A1 | 5/2014 | Aoyagi et al. |
| 2014/0169201 | A1 | 6/2014 | Tamura et al. |
| 2014/0169261 | A1 | 6/2014 | Ming et al. |
| 2014/0274081 | A1 | 9/2014 | Comeau et al. |
| 2014/0287759 | A1 | 9/2014 | Purohit |
| 2014/0348104 | A1 | 11/2014 | Morita |
| 2014/0376478 | A1 | 12/2014 | Morita |
| 2015/0098397 | A1 | 4/2015 | Damnjanovic et al. |
| 2015/0139197 | A1 | 5/2015 | He et al. |
| 2015/0139203 | A1 | 5/2015 | Miryala et al. |
| 2015/0163822 | A1 | 6/2015 | Guo et al. |
| 2015/0195795 | A1 | 7/2015 | Loehr et al. |
| 2015/0244429 | A1 | 8/2015 | Zhang et al. |
| 2015/0244489 | A1 | 8/2015 | Wang |
| 2015/0288427 | A1 | 10/2015 | Wang et al. |
| 2015/0326282 | A1 | 11/2015 | Futaki |
| 2015/0373730 | A1 | 12/2015 | Fujishiro et al. |
| 2016/0021526 | A1 | 1/2016 | Niu et al. |
| 2016/0028448 | A1 | 1/2016 | Park et al. |
| 2016/0037511 | A1 | 2/2016 | Vincze et al. |
| 2016/0044634 | A1 | 2/2016 | Seo et al. |
| 2016/0128123 | A1 | 5/2016 | Li |
| 2016/0174278 | A1 | 6/2016 | Gao et al. |
| 2016/0192420 | A1 | 6/2016 | Kim et al. |
| 2016/0192433 | A1 | 6/2016 | Deenoo et al. |
| 2016/0219475 | A1 | 7/2016 | Kim |
| 2016/0323832 | A1 | 11/2016 | Love et al. |
| 2017/0070931 | A1 | 3/2017 | Huang et al. |
| 2017/0078333 | A1 | 3/2017 | Tevlin |
| 2017/0105147 | A1 | 4/2017 | Jiang et al. |
| 2017/0164252 | A1 | 6/2017 | Chaudhuri et al. |
| 2017/0188406 | A1 | 6/2017 | Baligh et al. |
| 2017/0230986 | A1 | 8/2017 | Moon et al. |
| 2017/0238271 | A1 | 8/2017 | Viorel et al. |
| 2017/0250786 | A1 | 8/2017 | Better et al. |
| 2017/0148173 | A1 | 9/2017 | Yang |
| 2017/0272345 | A1 | 9/2017 | Viorel et al. |
| 2017/0289893 | A1* | 10/2017 | Manna .................. H04W 36/28 |
| 2017/0332389 | A1 | 11/2017 | Sun et al. |
| 2017/0339530 | A1 | 11/2017 | Maaref |
| 2017/0347277 | A1 | 11/2017 | Zhang et al. |
| 2017/0359759 | A1 | 12/2017 | Brown et al. |
| 2018/0152951 | A1 | 5/2018 | Zhuang et al. |
| 2018/0213450 | A1* | 7/2018 | Futaki ............... H04W 36/0069 |
| 2018/0219667 | A1 | 8/2018 | Zhao et al. |
| 2018/0220403 | A1 | 8/2018 | Wilson et al. |
| 2018/0235020 | A1 | 8/2018 | Maaref |
| 2018/0270895 | A1 | 9/2018 | Park et al. |
| 2018/0352511 | A1 | 12/2018 | Martin et al. |
| 2019/0028348 | A1 | 1/2019 | Chai |
| 2019/0053235 | A1 | 2/2019 | Novlan et al. |
| 2019/0075604 | A1 | 3/2019 | Wang et al. |
| 2019/0081657 | A1 | 3/2019 | Zeng et al. |
| 2019/0082331 | A1 | 3/2019 | Raghavan et al. |
| 2019/0165843 | A1 | 5/2019 | Wu et al. |
| 2019/0174346 | A1 | 6/2019 | Murray et al. |
| 2019/0174472 | A1 | 6/2019 | Lee et al. |
| 2019/0253106 | A1 | 8/2019 | Raghavan et al. |
| 2019/0312616 | A1 | 10/2019 | Christoffersson et al. |
| 2020/0015192 | A1 | 1/2020 | Chun |
| 2020/0145061 | A1* | 5/2020 | Black .................. H04B 7/0689 |
| 2020/0154442 | A1 | 5/2020 | Zhou |
| 2020/0178131 | A1 | 6/2020 | Wang et al. |
| 2020/0187281 | A1 | 6/2020 | Wang et al. |
| 2020/0196388 | A1 | 6/2020 | Zhang et al. |
| 2020/0220603 | A1 | 7/2020 | Hao et al. |
| 2020/0374970 | A1 | 11/2020 | Wang et al. |
| 2021/0029516 | A1 | 1/2021 | Wang et al. |
| 2021/0068123 | A1 | 3/2021 | Zhu et al. |
| 2021/0385903 | A1 | 12/2021 | Wang et al. |
| 2021/0391897 | A1 | 12/2021 | Wang et al. |
| 2022/0030414 | A1 | 1/2022 | Wang et al. |
| 2022/0038985 | A1 | 2/2022 | Deeno et al. |
| 2022/0039160 | A1 | 2/2022 | Wang et al. |

(56) References Cited

U.S. PATENT DOCUMENTS

| | | | |
|---|---|---|---|
| 2022/0110181 | A1 | 4/2022 | Miao |
| 2022/0311577 | A1 | 9/2022 | Matsummura et al. |

FOREIGN PATENT DOCUMENTS

| | | |
|---|---|---|
| CN | 102474743 | 5/2012 |
| CN | 103959672 | 7/2014 |
| CN | 104067660 | 9/2014 |
| CN | 105873124 | 8/2016 |
| CN | 106879051 | 6/2017 |
| CN | 107431962 | 12/2017 |
| CN | 107736048 | 2/2018 |
| CN | 107872889 | 4/2018 |
| CN | 108140035 | 6/2018 |
| EP | 2809104 | 12/2014 |
| EP | 2953393 | 12/2015 |
| EP | 3282786 | 2/2018 |
| EP | 3701638 | 9/2020 |
| WO | 0237771 | 5/2002 |
| WO | 2008147654 | 12/2008 |
| WO | 2012114151 | 8/2012 |
| WO | 2013091229 | 6/2013 |
| WO | 2014074919 | 5/2014 |
| WO | 2014179958 | 11/2014 |
| WO | 2015074270 | 5/2015 |
| WO | 2015163798 | 10/2015 |
| WO | 2016081375 | 5/2016 |
| WO | 2016191091 | 12/2016 |
| WO | 2017117340 | 7/2017 |
| WO | 2017148173 | 9/2017 |
| WO | 2018004278 | 1/2018 |
| WO | 2018010818 | 1/2018 |
| WO | 2018020015 | 2/2018 |
| WO | 2018031770 | 2/2018 |
| WO | 2018073485 | 4/2018 |
| WO | 2018130115 | 7/2018 |
| WO | 2018169343 | 9/2018 |
| WO | 2018202797 | 11/2018 |
| WO | 2018202798 | 11/2018 |
| WO | 2019001039 | 1/2019 |
| WO | 2019016141 | 1/2019 |
| WO | 2019038700 | 2/2019 |
| WO | 2018025789 | 5/2019 |
| WO | 2020112680 | 6/2020 |
| WO | 2020113010 | 6/2020 |
| WO | 2020117558 | 6/2020 |
| WO | 2020139811 | 7/2020 |
| WO | 2020142532 | 7/2020 |
| WO | 2020159773 | 8/2020 |
| WO | 2020172022 | 8/2020 |
| WO | 2020172372 | 8/2020 |
| WO | 2020186097 | 9/2020 |
| WO | 2020236429 | 11/2020 |
| WO | 2021015774 | 1/2021 |
| WO | 2021029879 | 2/2021 |
| WO | 2021054963 | 3/2021 |
| WO | 2021054964 | 3/2021 |

OTHER PUBLICATIONS

"Foreign Office Action", IN Application No. 202147017729, Mar. 9, 2022, 6 pages.
"Foreign Office Action", CN Application No. 201980069427.8, Oct. 18, 2021, 12 pages.
"International Preliminary Report on Patentability", Application No. PCT/US2019/063620, May 25, 2021, 8 pages.
"Notice of Allowance", U.S. Appl. No. 16/210,969, filed Oct. 26, 2021, 5 pages.
"Extended European Search Report", EP Application No. 22194393.9, Jan. 26, 2023, 6 pages.
"Foreign Office Action", EP Application No. 19845895.2, Dec. 13, 2022, 7 pages.
"International Preliminary Report on Patentability", Application No. PCT/US2019/063081, May 25, 2021, 9 pages.
"International Preliminary Report on Patentability", Application No. PCT/US2020/014638, Jul. 27, 2021, 7 pages.
"Non-Final Office Action", U.S. Appl. No. 16/210,969, filed Jun. 24, 2021, 19 pages.
"3GPP TS 24.501 V16.3.0", 3GPP TS 24.501 version 16.3.0, Dec. 2019, 645 pages.
3GPP TSG RAN WG4 25.942 V2.0.0: "RF System Scenarios", TSG RAN Working Group 4 (Radio) Meeting #8, Oct. 1999, 65 pages.
"3rd Generation Partnership Project; Technical Specification Group Services and System Aspects; Security architecture and procedures for 5G system", 3GPP TS 33.501 version 16.1.0 Release 16, Dec. 2019, 202 pages.
"5G; Non-Access-Stratum (NAS) protocol for 5G System (5GS); Stage 3", 3GPP TS 24.501 version 15.1.0 Release 15, Oct. 2018, 406 pages.
"5G; Study on New Radio (NR) Access Technology", ETSI TR 138 912; V14.0.0; Technical Report; 3GPP TR 38.912 version 14.0.0 Release 14, May 2017, 77 pages.
"Beam Management and Beam Reporting", 3GPP TSG RAN WG1 Meeting #88bis, R1-1704488, Spokane, Washington, USA Apr. 3-7, 2017, Apr. 2017, 7 pages.
"Corrected Notice of Allowance", U.S. Appl. No. 16/419,854, filed Dec. 16, 2020, 2 pages.
"Discussion on HARQ Management and HARQ-ACK Feedback", 3GPP TSG RAN WG1 Meeting #91, R1-1720203, Reno, USA, Nov. 27-Dec. 1, 2017, 5 pages.
"Discussion on NR Beamforming with UE-Group-Specific Beam Sweeping", 3GPP TSG-RAN WG1 Meeting #86 R1-166219 Gothenburg, Sweden, Aug. 22-26, 2016, 7 pages.
"Final Office Action", U.S. Appl. No. 16/210,969, filed Jan. 7, 2021, 17 pages.
"International Preliminary Report on Patentability", Application No. PCT/US2019/069129, Apr. 7, 2021, 14 pages.
"International Preliminary Report on Patentability", PCT Application No. PCT/US2019/068265, Jan. 18, 2021, 31 pages.
"International Preliminary Report on Patentability", Application No. PCT/US2019/068265, Jan. 18, 2021, 33 pages.
"International Preliminary Report on Patentability", Application No. PCT/US2019/051980, Dec. 8, 2020, 7 pages.
"International Preliminary Report on Patentability", Application No. PCT/US2019/063240, Feb. 18, 2021, 8 pages.
"International Search Report and Written Opinion", Application No. PCT/US2019/051980, Jul. 27, 2020, 19 pages.
"International Search Report and Written Opinion", PCT Application No. PCT/US2019/043355, Mar. 31, 2020, 12 pages.
"International Search Report and Written Opinion", PCT Application No. PCT/US2020/014638, May 13, 2020, 12 pages.
"International Search Report and Written Opinion", Application No. PCT/US2020/045777, Oct. 9, 2020, 13 pages.
"International Search Report and Written Opinion", PCT Application No. PCT/US2019/069129, Mar. 31, 2020, 13 pages.
"International Search Report and Written Opinion", PCT Application No. PCT/US2019/046374, Apr. 14, 2020, 13 pages.
"International Search Report and Written Opinion", PCT Application No. PCT/US2020/022460, May 26, 2020, 13 pages.
"International Search Report and Written Opinion", Application No. PCT/US2020/031716, Jul. 20, 2020, 14 pages.
"International Search Report and Written Opinion", PCT Application No. PCT/US2019/063081, Feb. 21, 2020, 14 pages.
"International Search Report and Written Opinion", PCT Application No. PCT/US2019/063620, Mar. 9, 2020, 14 pages.
"International Search Report and Written Opinion", PCT Application No. PCT/US2019/052005, May 18, 2020, 14 pages.
"International Search Report and Written Opinion", PCT Application No. PCT/US2020/017930, May 29, 2020, 14 pages.
"International Search Report and Written Opinion", PCT Application No. PCT/US2019/063240, Feb. 13, 2020, 16 pages.
"International Search Report and Written Opinion", PCT Application No. PCT/US2019/068265, Apr. 29, 2020, 29 pages.
"Invitation to Pay Additional Fees", PCT Application No. PCT/US2019/051980, Jun. 4, 2020, 10 pages.

(56) References Cited

OTHER PUBLICATIONS

"Invitation to Pay Additional Fees", PCT Application No. PCT/US2019/068265, Mar. 13, 2020, 13 pages.
"LTE; Evolved Universal Terrestrial Radio Access (E-UTRA) and Evolved Universal Terrestrial Radio Access Network (E-UTRAN); Overall Description; Stage 2 (3GPP TS 36.300 version 15.3.0 Release 15)", ETSI TS 136 300 V15.3.0, Oct. 2018, 366 pages.
"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0, Jan. 2020, 137 pages.
"Non-Final Office Action", U.S. Appl. No. 16/210,969, filed Jul. 23, 2020, 15 Pages.
"Non-Final Office Action", U.S. Appl. No. 16/206,579, filed Apr. 1, 2020, 23 Pages.
"Non-Final Office Action", U.S. Appl. No. 16/419,854, filed Jun. 30, 2020, 29 Pages.
"Notice of Allowance", U.S. Appl. No. 16/206,579, filed Jul. 8, 2020, 10 Pages.
"Notice of Allowance", U.S. Appl. No. 16/419,854, filed Nov. 5, 2020, 11 pages.
"On the Need for More Flexible Configurations Related to CSI Reporting", 3GPP TSG RAN WG1 Meeting #87, R1-1611237, Reno, USA, Nov. 14-18, 2016, 6 pages.
"Supplemental Notice of Allowance", U.S. Appl. No. 16/206,579, filed Sep. 30, 2020, 3 pages.
"Third Generation Partnership Project; Technical Specification Group Services and System Aspects; Service requirements for the 5G system; Stage 1", 3GPP TS 22.261 version 16.10.0 Release 16, Dec. 2019, 72 pages.
"U.S. Appl. No. 62/785,949", filed Feb. 21, 2019.
"U.S. Appl. No. 62/785,949", filed Dec. 28, 2018.
"UE Overheating for EN-DC", 3GPP R2-1802414, UE overheating for EN-DC, in 3GPP TSG-RAN WG2 Meeting #101, Apple Inc., Mar. 2, 2018, 3 pages.
"Universal Mobile Telecommunications System (UMTS); Automatic Neighbour Relation (ANR) for UTRAN", 3GPP TS 25.484 version 10.0.1 Release 10, Jan. 2012, 21 pages.
"Universal Mobile Telecommunications System (UMTS); Automatic Neighbour Relation (ANR) for UTRAN", 3GPP TS 25.484 version 11.0.0 Release 11, Jan. 2012, 22 pages.
"Written Opinion", Application No. PCT/US2019/063240, Oct. 27, 2020, 10 pages.
"Written Opinion", Application No. PCT/US2019/068265, Sep. 25, 2020, 20 pages.
"Written Opinion", Application No. PCT/US2020/014638, Nov. 26, 2020, 5 pages.
"Written Opinion", PCT Application No. PCT/US2020/031716, Mar. 25, 2021, 6 pages.
"Written Opinion", PCT Application No. PCT/US2019/069129, Dec. 14, 2020, 7 pages.
Aboba, B. et al., "Extensible Authentication Protocol (EAP)", RFC Editor; Retrieved from https://www.rfc-editor.org/info/rfc3748, Jun. 2004, 67 pages.
Gorcin, Ali et al., "Hybrid Automatic Neighbor Relations for 5G Wireless Networks", 2017, 6 pages.
Klingenbrunn, Thomas et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.
Lin, Roy et al., "Handling of Extensible Authentication Protocol Based Non-Access Stratum Authentication Failures", Technical Disclosure Commons; Retrieved from https://www.tdcommons.org/dpubs_series/3191, Apr. 23, 2020, 11 pages.
Son, Harrison J. , "7 Deployment Scenarios of Private 5G Networks", Netmanias; Retrieved from https://www.netmanias.com/en/post/blog/14500/5g-edge-kt-sk-telecom/7-deployment-scenarios-of-private-5g-networks, Oct. 21, 2019, 11 pages.
Wu, Chih-Hsiang , "Handling Overheating in a Wireless-Communication Device", Technical Disclosure Commons; Retrieved from https://www.tdcommons.org/dpubs_series/2343, Jul. 12, 2019, 22 pages.
Zhang, Jinfang et al., "PoC of SCMA-Based Uplink Grant-Free Transmission in UCNC for 5G", IEEE Journal on Selected Areas in Communications, vol. 35, No. 6, Jun. 2017, 10 pages.
Zhang, Jinyu et al., "Grant-less Uplink Transmission for LTE Operated in Unlicensed Spectrum", Feb. 14, 2018, 6 pages.
"Foreign Office Action", AU Application No. 20200216095, May 2, 2022, 7 pages.
"Foreign Office Action", IN Application No. 202147026024, Jun. 3, 2022, 7 pages.
"Foreign Office Action", IN Application No. 202247010266, Jul. 20, 2022, 7 pages.
"Foreign Office Action", CN Application No. 201980083468.2, Sep. 21, 2023, 11 pages.
"Non-Final Office Action", U.S. Appl. No. 17/295,815, filed Oct. 10, 2023, 10 pages.
"Notice of Allowance", U.S. Appl. No. 17/275,632, filed Aug. 22, 2023, 7 pages.
"Report of e-mail discussion [95#30] Capability coordination for NR and LTE", 3GPP TSG-RAN WG2 Meeting #95bis—R2-167065, Oct. 2016, 40 pages.
"Updates for M2AP baseline CR for MBMS congestion management", 3GPP TSG RAN WG3 Meeting #87—R3-150291, Feb. 2015, 4 pages.
"Final Office Action", U.S. Appl. No. 17/295,815, filed Jan. 3, 2024, 12 pages.
"Foreign Office Action", AU Application No. 2023202260, Apr. 2, 2024, 6 pages.
"Non-Final Office Action", U.S. Appl. No. 17/295,815, filed Apr. 1, 2024, 13 pages.
"Notice of Allowance", U.S. Appl. No. 17/295,815, filed Jun. 28, 2024, 9 pages.
"Foreign Office Action", EP Application No. 19845895.2, Oct. 18, 2024, 6 pages.

* cited by examiner

DYNAMIC CARRIER SUBBAND OPERATION FOR ACTIVE COORDINATION SETS

RELATED APPLICATION(S)

This application is a national stage entry of International Application No. PCT/US2020/014638, filed Jan. 22, 2020, which claims the benefit of U.S. Provisional Application No. 62/797,885, filed Jan. 28, 2019, the disclosures which are incorporated herein by reference in their entirety.

BACKGROUND

The evolution of wireless communication to fifth generation (5G) and sixth generation (6G) standards and technologies provides higher data rates and greater capacity, with improved reliability and lower latency, which enhances mobile broadband services. 5G and 6G technologies also provide new classes of services for vehicular, fixed wireless broadband, and the Internet of Things (IoT).

A unified air interface, which utilizes licensed, unlicensed, and shared license radio spectrum, in multiple frequency bands, is one aspect of enabling the capabilities of 5G and 6G systems. The 5G and 6G air interface utilizes radio spectrum in bands below 1 GHz (sub-gigahertz), below 6 GHz (sub-6 GHz), and above 6 GHz. Radio spectrum above 6 GHz includes millimeter wave (mmWave) frequency bands that provide wide channel bandwidths to support higher data rates for wireless broadband.

To increase data rates, throughput, and reliability for a user equipment, 5G and 6G systems support various forms of wireless connectivity that use multiple radio links between base stations and the user equipment. Techniques such as dual connectivity (DC) or coordinated multipoint (CoMP) communications, often coupled with beamformed signals, can improve data rates, throughput, and reliability, especially as received signal strengths decease for the user equipment near the edge of cells. The use of these radio link configurations increases the complexity of mobility management to maintain high data rates and reliability for the user equipment.

Conventional mobility management techniques are based on base station neighbor relationships and use handovers to maintain connectivity for the user equipment. However, conventional handover techniques do not account for internal conditions or states of the user equipment that require mitigation, such as a thermal condition in the user equipment or battery capacity of the user equipment.

SUMMARY

This summary is provided to introduce simplified concepts of dynamic carrier subband operation for active coordination sets. The simplified concepts are further described below in the Detailed Description. This summary is not intended to identify essential features of the claimed subject matter, nor is it intended for use in determining the scope of the claimed subject matter.

In some aspects, a method for coordinating joint communication with a user equipment (UE) by a master base station of a first Active Coordination Set (ACS) is described in which the master base station selects a first carrier subband associated with the first ACS for joint communication with the UE, coordinates the joint communication for the UE with other base stations in the first ACS, and monitors the joint communication with the UE. Based on the monitoring the joint communication, the master base station selects a second carrier subband that is associated with a second ACS for the joint communication with the UE and coordinates with base stations associated with the second ACS to jointly communicate with the UE using the second carrier subband.

In another aspect, a network device is described that is configured for coordinating joint communication with a user equipment (UE) using one or more Active Coordination Sets. The network device includes a processor and memory system to implement a joint communication scheduler application. The joint communication scheduler application is configured to select a first carrier subband associated with the first ACS for joint communication with the UE, to coordinate, using the Xn interface, the joint communication for the UE with other base stations in the first ACS, and to monitor the joint communication with the UE. The joint communication scheduler application is configured to, based on the monitoring of the joint communication, select a second carrier subband that is associated with a second ACS for the joint communication with the UE and to coordinate, using the Xn interface, with base stations associated with the second ACS to jointly communicate with the UE using the second carrier subband.

In another aspect, a network device is described that is configured for performing any of the methods disclosed herein. In yet another aspect, processor-readable medium is described that comprises instructions which, when executed by one or more processors, cause a device including the one or more processors to perform any of the methods disclosed herein.

BRIEF DESCRIPTION OF THE DRAWINGS

Aspects of dynamic carrier subband operation for active coordination sets are described with reference to the following drawings. The same numbers are used throughout the drawings to reference like features and components.

DETAILED DESCRIPTION

Figure 1:
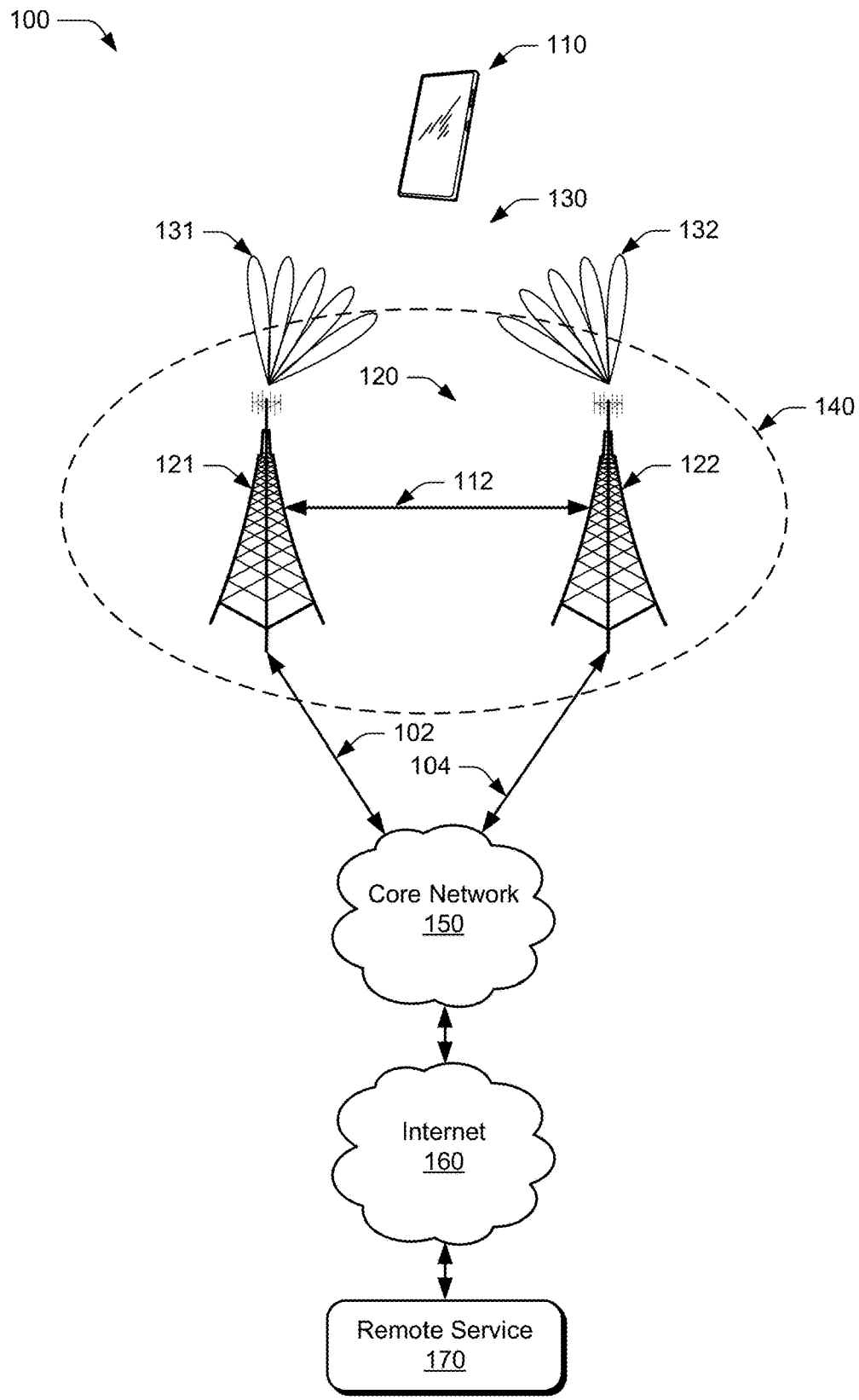
FIG. 1 illustrates an example wireless network system in which various aspects of dynamic carrier subband operation for active coordination sets can be implemented.

This document describes methods, devices, systems, and means for dynamic carrier subband operation for active coordination sets. A master base station selects a first carrier subband associated with a first Active Coordination Set (ACS) for joint communication with a user equipment (UE), coordinates the joint communication for the UE with other base stations in the first ACS, and monitors the joint communication with the UE. Based on the monitoring of the joint communication, the master base station selects a second carrier subband that is associated with a second ACS for the joint communication with the UE and coordinates with base stations associated with the second ACS to jointly communicate with the UE using the second carrier subband.

In aspects, an Active Coordination Set (ACS) is a user equipment-specific set of base stations (e.g., 5G and/or 6G base stations) usable for wireless communication by the user equipment. The ACS may be a component of, or used to implement, a user-centric no-cell (UCNC) network architecture. More specifically, the base stations that are included in the ACS are usable for joint communication (coordinated communication), which includes joint transmission, joint reception, or joint transmission and joint reception between the user equipment and one or more of the base stations in the ACS. The joint transmission and/or reception techniques include CoMP, Single Radio Access Technology (RAT) Dual Connectivity (single-RAT DC), and/or Multi-Radio Access Technology Dual Connectivity (MR-DC).

As channel conditions change for the user equipment, the user equipment, a master base station, and/or a core network function can add or remove base stations from the ACS while the user equipment concurrently communicates with base stations in the ACS that provide usable link quality. Based on these changes to the ACS, the master base station can add or remove base stations from the joint communication with the user equipment without performing a handover that interrupts data communication with the user equipment.

In aspects, a UE and/or an ACS Server can create multiple ACSs for that particular UE. The UE can operate using one or more ACSs. The UE can use the ACSs independently (e.g., use one ACS at a time) for communication with a Radio Access Network (RAN). The UE can operate using multiple ACSs concurrently, either by using each ACS for a separate communication link with the RAN or by using multiple ACSs cooperatively to support a single communication link with the RAN.

In further aspects, an ACS can be created, maintained, and used based on a variety of factors. A RAN may include radio spectrum from various radio bands (subbands), such as radio spectrum in a below 1 GHz (sub-gigahertz) band, a below 6 GHz (sub-6 GHz) band, and an above-6 GHz band that includes millimeter wave (mmWave) frequencies. For example, one factor for ACS creation and use is based on radio frequencies. A first ACS can include a carrier subband(s) in the sub-gigahertz band that provides coverage of relatively larger geographic areas than a second ACS for a carrier subband(s) at a higher radio frequency (RF). A carrier subband can be related to a portion of a radio band, such as a lower-frequency portion of a radio band that has different propagation characteristics than a higher-frequency portion of the same radio band.

In another aspect, an ACS can be created, maintained, and used based on the channel bandwidth supported in a carrier subband. For example, a first ACS can include a carrier subband(s) in mmWave RF spectrum that provides wide channel bandwidths to support higher data rates than a second ACS for a carrier subband(s) in the sub-gigahertz band that only supports relatively-narrower channel bandwidths with inherently lower data rates.

In further aspects, ACSs can be created, maintained, and used based on other factors, such as: a first ACS used for control-plane signaling and a second ACS(s) used for user-plane data communication, a first ACS used for uplink (UL) communication and a second ACS used for downlink (DL) communication, or a first ACS used when the UE is in a disengaged mode and a second ACS(s) used when the UE is in an engaged mode. For example, the first ACS may include lower-frequency carrier subbands to provide more-reliable control-plane signaling using narrower channels and lower-order modulation and coding schemes (MCS) and the second ACS may include a carrier subband(s) that provides wider channels and higher data rates for user-plane data communication.

In another example, the first ACS may include a carrier subband(s) with narrower channel bandwidths for uplink (UL) data communication and the second ACS may include a carrier subband(s) that provides wider channels and higher data rates for downlink (DL) communications. In a further example, the first ACS may include lower-frequency carrier subbands for use when the UE is in the disengaged mode to reduce UE power consumption by enabling the UE to operate at lower frequencies and the second ACS may include a carrier subband(s) that provides wider channels and higher data rates when the UE is in the engaged mode to support higher data-rate communication.

In one aspect, by providing support in the UE for multiple ACSs and dynamic switching between ACSs, the complexity of UE implementations can be reduced. For example, bandwidth switching decisions can be made by a master base station that monitors UE communications, such as DL data buffered in the RAN for the UE, and dynamically switches the UE from a lower-bandwidth ACS (e.g., an ACS with a carrier subband with a 1 MHz channel bandwidth) to a higher-bandwidth ACS (e.g., an ACS with a carrier subband with a 10 MHz or 100 MHz channel bandwidth).

In another aspect, by providing support in the UE for multiple ACSs and dynamic switching between ACSs, thermal and power constraints of the UE can be balanced against control-plane signaling and user-plane data communication. For example, if the UE determines that is constrained by power (e.g., low battery capacity) or thermal (e.g., an overheating condition in the UE) considerations, the master base station can dynamically switch the UE to an ACS that reduces power consumption or heat generation for the UE, such an ACS in a lower RF band, narrower channel bandwidths, and/or lower-order MCS.

In aspects, a carrier subband can be any portion of radio spectrum available in a RAN. The carrier subband can be an RF band (e.g., the sub-gigahertz band, the sub-6 GHz band, or the above-6 GHz band), a portion, subband, or bandwidth part of an RF band, a portion of an RF band that is allocated for channels of a specific bandwidth (e.g., 1 MHz, 10 MHz, or 100 MHz channel bandwidths), channels with a particular numerology in an RF band, and so forth.

In other aspects, a master base station (or an ACS Server acting as a controller for base stations in an ACS) can select and switch the ACS(s) for the UE based on one or more factors. For example, the master base station may select an ACS(s) based on one or more of: UE capability information received from the UE; DL data queued for the UE; a buffer status for UL data pending for transmission by the UE; a request from the UE based on a UE-related state, such as a thermal or power condition in the UE; network resource scheduling needs of the RAN; link quality measurements; or any other suitable factor(s).

In other aspects, the UE can switch from communicating using a single ACS to using another single ACS, switch from communicating using a single ACS to using multiple ACSs, or switch from communicating using multiple ACSs to using a single ACS. Switching between ACSs can be coordinated between master base stations for each of the ACSs using peer-to-peer communication (e.g., using an Xn interface), or a controller, such as an ACS Server, can coordinate with the master base stations in the ACSs to direct the switching of the UE between ACSs.

While features and concepts of the described systems and methods for dynamic carrier subband operation for active coordination sets can be implemented in any number of different environments, systems, devices, and/or various configurations, aspects of dynamic carrier subband operation for active coordination sets are described in the context of the following example devices, systems, and configurations.

Example Environment

FIG. 1 illustrates an example environment 100 in which various aspects of dynamic carrier subband operation for active coordination sets can be implemented. The example environment 100 includes a user equipment 110 (UE 110) that communicates with one or more base stations 120 (illustrated as base stations 121 and 122), through one or more wireless communication links 130 (wireless link 130), illustrated as wireless links 131 and 132. In this example, the user equipment 110 is implemented as a smartphone. Although illustrated as a smartphone, the user equipment 110 may be implemented as any suitable computing or electronic device, such as a mobile communication device, a modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, a 6G node B, or the like) may be implemented in a macrocell, microcell, small cell, picocell, and the like, or any combination thereof.

The base stations 120 communicate with the user equipment 110 via the wireless links 131 and 132, which may be implemented as any suitable type of wireless link. The wireless links 131 and 132 can include a downlink of data and control information communicated from the base stations 120 to the user equipment 110, an uplink of other data and control information communicated from the user equipment 110 to the base stations 120, or both. The wireless links 130 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), 6G, and so forth. Multiple wireless links 130 may be aggregated in a carrier aggregation to provide a higher data rate for the user equipment 110. Multiple wireless links 130 from multiple base stations 120 may be configured for Coordinated Multipoint (CoMP) communication with the user equipment 110. Additionally, multiple wireless links 130 may be configured for single-radio access technology (RAT) (single-RAT) dual connectivity (single-RAT-DC) or multi-RAT dual connectivity (MR-DC).

The base stations 120 are collectively a Radio Access Network 140 (RAN, Evolved Universal Terrestrial Radio Access Network, E-UTRAN, 5G NR RAN or NR RAN). The base stations 121 and 122 in the RAN 140 are connected to a core network 150, such as a Fifth Generation Core (5GC) or 6G core network. The base stations 121 and 122 connect, at 102 and 104 respectively, to the core network 150 via an NG2 interface (or a similar 6G interface) for control-plane signaling and via an NG3 interface (or a similar 6G interface) for user-plane data communications. In addition to connections to core networks, base stations 120 may communicate with each other via an Xn Application Protocol (XnAP), at 112, to exchange user-plane and control-plane data. The user equipment 110 may also connect, via the core network 150, to public networks, such as the Internet 160 to interact with a remote service 170.

Example Devices

Figure 2:
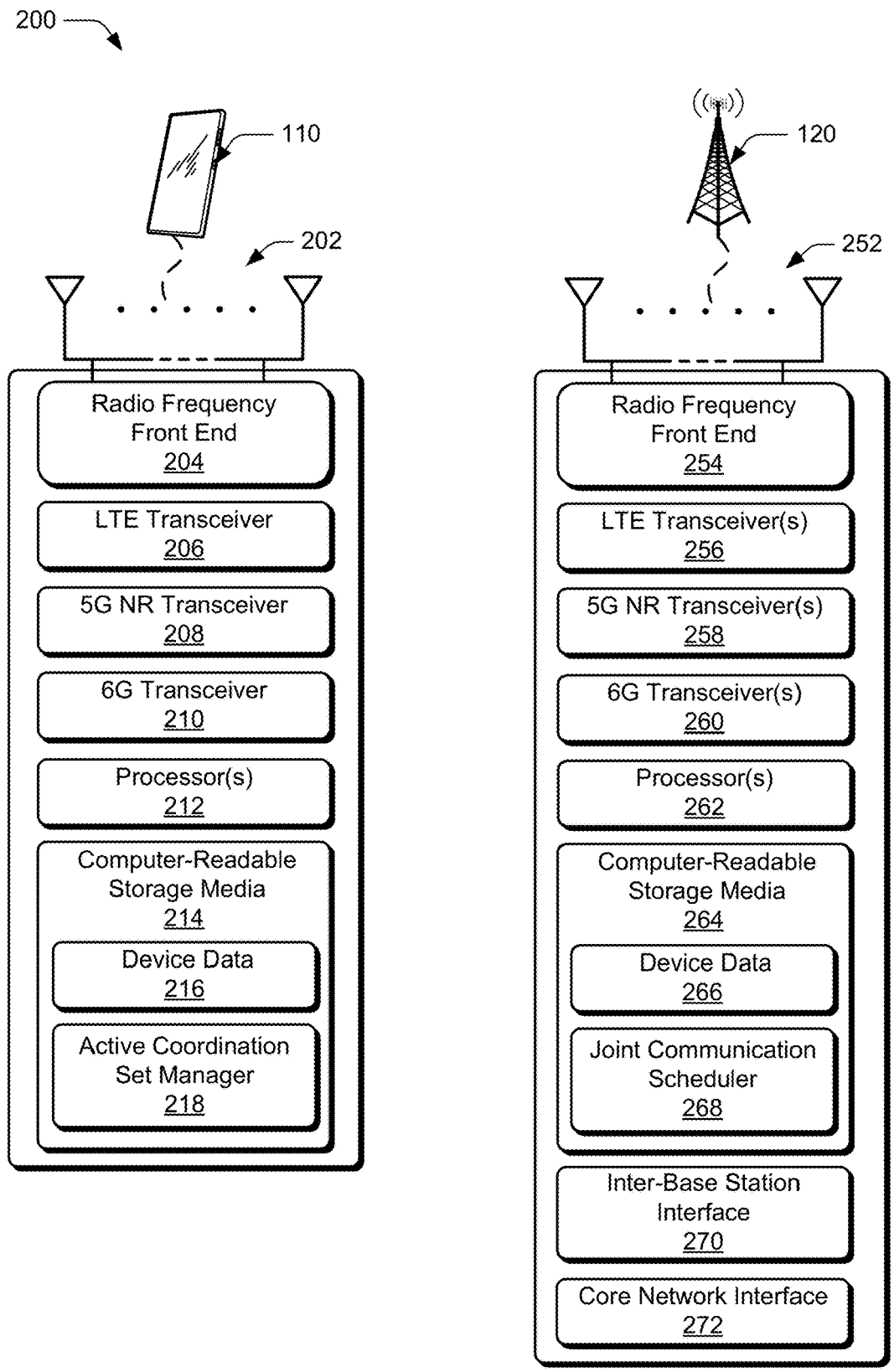
FIG. 2 illustrates an example device diagram that can implement various aspects of dynamic carrier subband operation for active coordination sets.

FIG. 2 illustrates an example device diagram 200 of the user equipment 110 and the base stations 120. The user equipment 110 and the base stations 120 may include additional functions and interfaces that are omitted from FIG. 2 for the sake of clarity. The user equipment 110 includes antennas 202, a radio frequency front end 204 (RF front end 204), an LTE transceiver 206, a 5G NR transceiver 208, and a 6G transceiver 210 for communicating with base stations 120 in the RAN 140. The RF front end 204 of the user equipment 110 can couple or connect the LTE transceiver 206, the 5G NR transceiver 208, and the 6G transceiver 210 to the antennas 202 to facilitate various types of wireless communication. The antennas 202 of the user equipment 110 may include an array of multiple antennas that are configured similarly to or differently from each other. The antennas 202 and the RF front end 204 can be tuned to, and/or be tunable to, one or more frequency bands defined by the 3GPP LTE, 5G NR, and 6G communication standards and implemented by the LTE transceiver 206, the 5G NR transceiver 208, and/or the 6G transceiver 210. Additionally, the antennas 202, the RF front end 204, the LTE transceiver 206, the 5G NR transceiver 208, and/or the 6G transceiver 210 may be configured to support beamforming for the transmission and reception of communications with the base stations 120. By way of example and not limitation, the antennas 202 and the RF front end 204 can be implemented for operation in sub-gigahertz bands, sub-6 GHZ bands, and/or above 6 GHz bands that are defined by the 3GPP LTE, 5G NR, and 6G communication standards.

The user equipment 110 also includes processor(s) 212 and computer-readable storage media 214 (CRM 214). The processor 212 may be a single core processor or a multiple core processor composed of a variety of materials, such as silicon, polysilicon, high-K dielectric, copper, and so on. The computer-readable storage media described herein excludes propagating signals. CRM 214 may include any suitable memory or storage device such as random-access memory (RAM), static RAM (SRAM), dynamic RAM (DRAM), non-volatile RAM (NVRAM), read-only memory (ROM), or Flash memory useable to store device data 216 of the user equipment 110. The device data 216 includes user data, multimedia data, beamforming codebooks, applications, and/or an operating system of the user equipment 110, which are executable by processor(s) 212 to enable user-plane communication, control-plane signaling, and user interaction with the user equipment 110.

In some implementations, the CRM 214 may also include an active coordination set (ACS) manager 218. The ACS manager 218 can communicate with the antennas 202, the RF front end 204, the LTE transceiver 206, the 5G NR transceiver 208, and/or the 6G transceiver 210 to monitor the quality of the wireless communication links 130.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, one or more 5G NR transceivers 258, and/or one or more 6G transceivers 260 for communicating with the UE 110. The RF front end 254 of the base stations 120 can couple or connect the LTE transceivers 256, the 5G NR transceivers 258, and/or the 6G transceivers 260 to the antennas 252 to facilitate various types of wireless communication. The antennas 252 of the base stations 120 may include an array of multiple antennas that are configured similarly to or differently from each other. The antennas 252 and the RF front end 254 can be tuned to, and/or be tunable to, one or more frequency band defined by the 3GPP LTE, 5G NR, and 6G communication standards, and implemented by the LTE transceivers 256, one or more 5G NR transceivers 258, and/or one or more 6G transceivers 260. Additionally, the antennas 252, the RF front end 254, the LTE transceivers 256, one or more 5G NR transceivers 258, and/or one or more 6G transceivers 260 may be configured to support beamforming, such as Massive-MIMO, for the transmission and reception of communications with the UE 110.

The base stations 120 also include processor(s) 262 and computer-readable storage media 264 (CRM 264). The processor 262 may be a single core processor or a multiple core processor composed of a variety of materials, such as silicon, polysilicon, high-K dielectric, copper, and so on. CRM 264 may include any suitable memory or storage device such as random-access memory (RAM), static RAM (SRAM), dynamic RAM (DRAM), non-volatile RAM (NVRAM), read-only memory (ROM), or Flash memory useable to store device data 266 of the base stations 120. The device data 266 includes network scheduling data, radio resource management data, beamforming codebooks, applications, and/or an operating system of the base stations 120, which are executable by processor(s) 262 to enable communication with the user equipment 110.

CRM 264 also includes a joint communication scheduler 268. Alternately or additionally, the joint communication scheduler 268 may be implemented in whole or part as hardware logic or circuitry integrated with or separate from other components of the base stations 120. In at least some aspects, the joint communication scheduler 268 configures the LTE transceivers 256, the 5G NR transceivers 258, and the 6G transceiver(s) 260 for communication with the user equipment 110, as well as communication with a core network, such as the core network 150, and routing user-plane and control-plane data for joint communication. Additionally, the joint communication scheduler 268 may allocate air interface resources and schedule communications for the UE 110 and base stations 120 in the ACS when the base station 120 is acting as a master base station for the base stations 120 in the ACS.

The base stations 120 include an inter-base station interface 270, such as an Xn and/or X2 interface, which the joint communication scheduler 268 configures to exchange user-plane and control-plane data between other base stations 120, to manage the communication of the base stations 120 with the user equipment 110. The base stations 120 include a core network interface 272 that the joint communication scheduler 268 configures to exchange user-plane and control-plane data with core network functions and/or entities.

Figure 3:
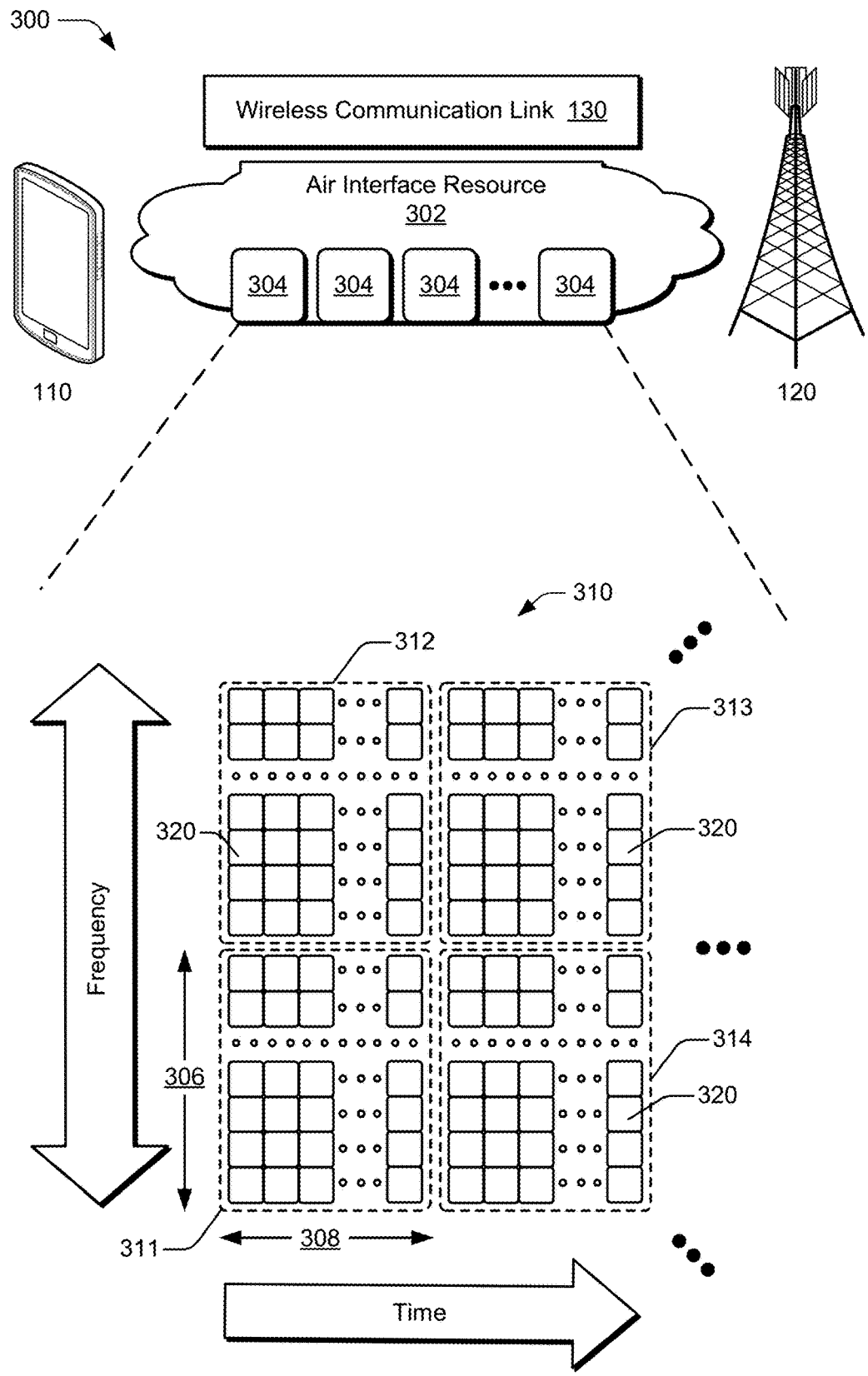
FIG. 3 illustrates an air interface resource that extends between a user equipment and a base station and with which various aspects of dynamic carrier subband operation for active coordination sets techniques can be implemented.

FIG. 3 illustrates an air interface resource that extends between a user equipment and a base station and with which various aspects of dynamic carrier subband operation for active coordination sets can be implemented. The air interface resource 302 can be divided into resource units 304, each of which occupies some intersection of frequency spectrum and elapsed time. A portion of the air interface resource 302 is illustrated graphically in a grid or matrix having multiple resource blocks 310, including example resource blocks 311, 312, 313, 314. An example of a resource unit 304 therefore includes at least one resource block 310. As shown, time is depicted along the horizontal dimension as the abscissa axis, and frequency is depicted along the vertical dimension as the ordinate axis. The air interface resource 302, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations generally, the base stations 120 allocate portions (e.g., the resource units 304) of the air interface resource 302 for uplink and downlink communications. Each resource block 310 of network access resources may be allocated to support respective wireless communication links 130 of multiple user equipment 110. In the lower left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or 7 orthogonal frequency-division multiplexing (OFDM) symbols). The time interval 308 includes subintervals that may each correspond to a symbol, such as an OFDM symbol. As shown in FIG. 3, each resource block 310 may include multiple resource elements 320 (REs) that correspond to, or are defined by, a subcarrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth.

In example implementations, multiple user equipment 110 (one of which is shown) are communicating with the base stations 120 (one of which is shown) through access provided by portions of the air interface resource 302. The joint communication scheduler 268 (shown in FIG. 2) may determine a respective data-rate, type of information, or amount of information (e.g., data or control information) to be communicated (e.g., transmitted) by the user equipment 110. For example, the joint communication scheduler 268 can determine that each user equipment 110 is to transmit at a different respective data rate or transmit a different respective amount of information. The joint communication scheduler 268 then allocates one or more resource blocks 310 to each user equipment 110 based on the determined data rate or amount of information.

Additionally, or in the alternative to block-level resource grants, the joint communication scheduler 268 may allocate resource units at an element-level. Thus, the joint communication scheduler 268 may allocate one or more resource elements 320 or individual subcarriers to different user equipment 110. By so doing, one resource block 310 can be allocated to facilitate network access for multiple user equipment 110. Accordingly, the joint communication scheduler 268 may allocate, at various granularities, one or up to all subcarriers or resource elements 320 of a resource block 310 to one user equipment 110 or divided across multiple user equipment 110, thereby enabling higher network utilization or increased spectrum efficiency.

The joint communication scheduler 268 can therefore allocate air interface resource 302 by resource unit 304, resource block 310, frequency carrier, time interval, resource element 320, frequency subcarrier, time subinterval, symbol, spreading code, some combination thereof, and so forth. Based on respective allocations of resource units 304, the joint communication scheduler 268 can transmit respective messages to the multiple user equipment 110 indicating the respective allocation of resource units 304 to each user equipment 110. Each message may enable a respective user equipment 110 to queue the information or configure the LTE transceiver 206, the 5G NR transceiver 208, and/or the 6G transceiver 210 to communicate via the allocated resource units 304 of the air interface resource 302.

User Equipment States

Figure 4:
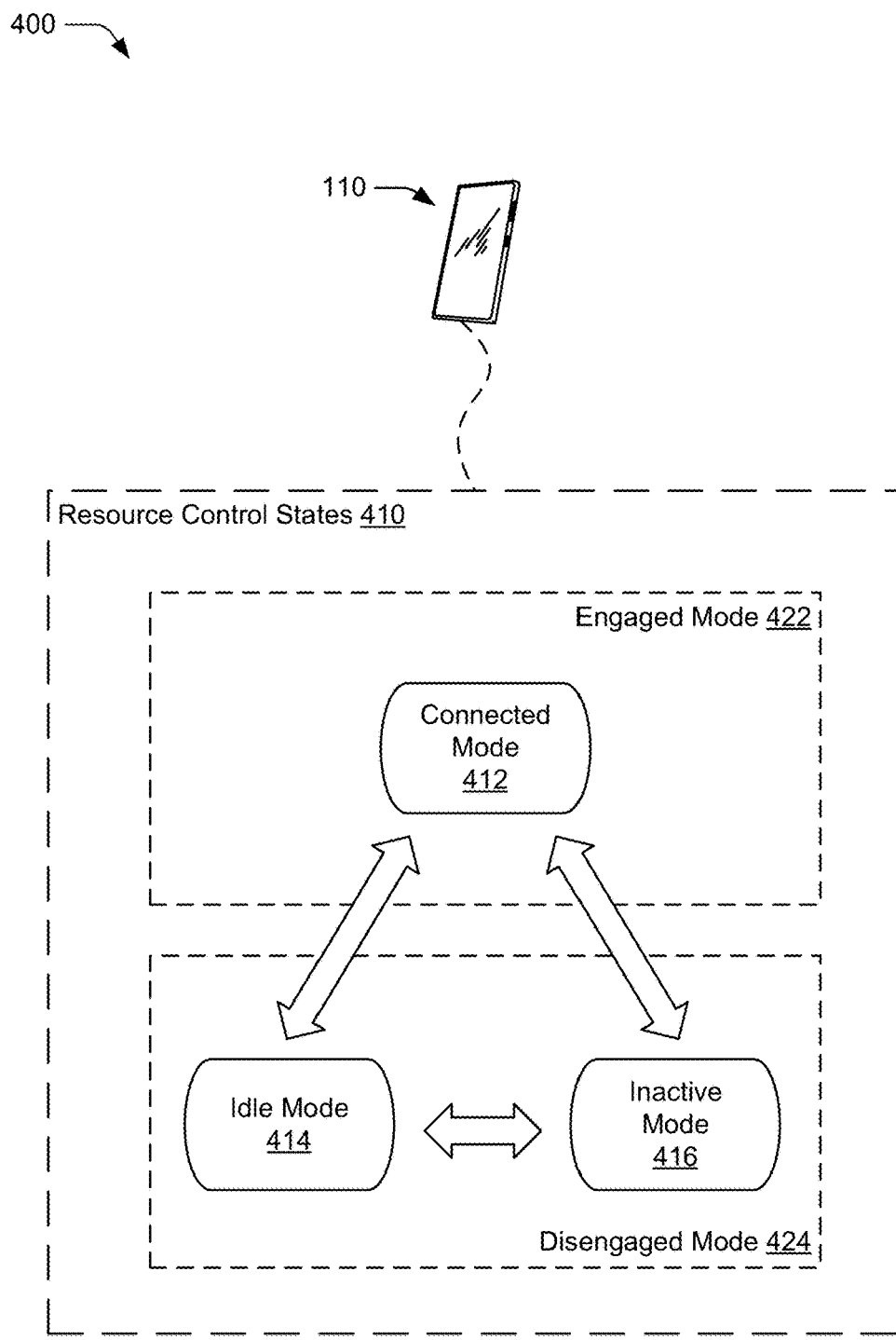
FIG. 4 illustrates example user equipment states which may implement various aspects of dynamic carrier subband operation for active coordination sets.

FIG. 4 illustrates example user equipment states 400, which may benefit from aspects of dynamic carrier subband operation for active coordination sets. A wireless network operator provides its telecommunication services to user equipment devices through a wireless network. To communicate wirelessly with the network, a user equipment 110 utilizes a radio resource control (RRC) procedure to establish a connection to the network via a cell (e.g., a base station, a serving cell). Upon establishing the connection to the network via the base station 120, the UE 110 enters a connected mode (e.g., RRC connected mode, RRC_CONNECTED state, NR-RRC CONNECTED state, E-UTRA RRC CONNECTED state).

The UE 110 operates according to different resource control states 410. Different situations may occur that cause the UE 110 to transition between the different resource control states 410 as determined by the radio access technology. Examples of the resource control states 410 illustrated in FIG. 4 include a connected mode 412, an idle mode 414, and an inactive mode 416. A user equipment 110 is either in the connected mode 412 or in the inactive mode 416 when an RRC connection is active. If an RRC connection is not active, then the user equipment 110 is in the idle mode 414.

In establishing an RRC connection, the user equipment 110 may transition from the idle mode 414 to the connected mode 412. After establishing the connection, the user equipment 110 may transition (e.g., upon connection inactivation) from the connected mode 412 to an inactive mode 416 (e.g., RRC inactive mode, RRC INACTIVE state, NR-RRC INACTIVE state) and the user equipment 110 may transition (e.g., via an RRC connection resume procedure) from the inactive mode 416 to the connected mode 412. After establishing the connection, the user equipment 110 may transition between the connected mode 412 to an idle mode 414 (e.g., RRC idle mode, RRC_IDLE state, NR-RRC IDLE state, E-UTRA RRC IDLE state), for instance upon the network releasing the RRC connection. Further, the user equipment 110 may transition between the inactive mode 416 and the idle mode 414.

Further, the UE 110 may be in an engaged mode 422 or may be in a disengaged mode 424. As used herein, an engaged mode 422 is a connected mode (e.g., the connected mode 412) and a disengaged mode 424 is an idle, disconnected, connected-but-inactive, or connected-but-dormant mode (e.g., idle mode 414, inactive mode 416). In some cases, in the disengaged mode 424, the UE 110 may still be Network Access Stratum (NAS) registered with radio bearer active (e.g., inactive mode 416). In simple terms, an engaged mode may signify that an ongoing wireless connection has been established between the UE 110 and a base station 120, whereas a disengaged mode may signify a state in which there is no ongoing wireless connection between the UE 110 and a base station 120.

Each of the different resource control states 410 may have different quantities or types of resources available, which may affect power consumption within the UE 110. In general, the connected mode 412 represents the UE 110 actively connected to (engaged with) the base station 120. In the inactive mode 416, the UE 110 suspends connectivity with the base station 120 and retains information that enables connectivity with the base station 120 to be quickly re-established. In the idle mode 414 the UE 110 releases the connection with the base station 120.

Some of the resource control states 410 may be limited to certain radio access technologies. For example, the inactive mode 416 may be supported in LTE Release 15 (eLTE), 5G NR, and 6G, but not in 3G or previous generations of 4G standards. Other resource control states may be common or compatible across multiple radio access technologies, such as the connected mode 412 or the idle mode 414.

Active Coordination Set

Figure 5:
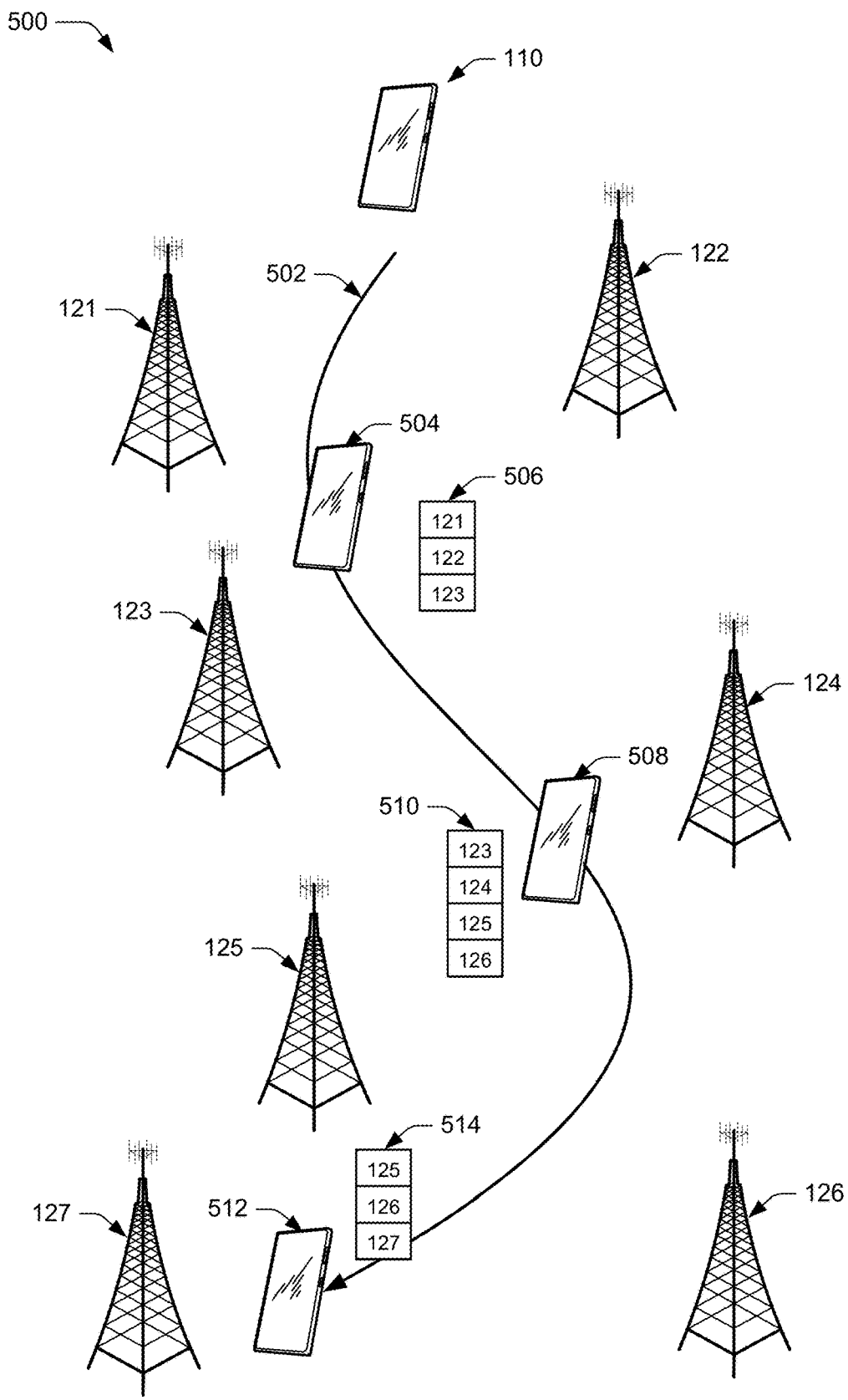
FIG. 5 illustrates an example of a user equipment, in an engaged mode, moving through a radio access network that includes multiple base stations in accordance with aspects of dynamic carrier subband operation for active coordination sets techniques.

In aspects, dynamic carrier subband operation for active coordination sets is described with which the user equipment 110, while in the engaged mode 422, measures the link quality of candidate base stations 120 to determine which base stations 120 to include in the ACS. FIG. 5 illustrates an example environment 500 in which a user equipment 110, in the engaged mode 422, is moving through a radio access network (RAN) that includes multiple base stations 120, illustrated as base stations 121-127. These base stations may utilize different technologies (e.g., LTE, 5G NR, 6G) at a variety of frequencies (e.g., sub-gigahertz, sub-6 GHz, and above 6 GHz bands and sub-bands).

For example, the user equipment 110 follows a path 502 through the RAN 140 while periodically measuring the link quality of base stations 120 that are currently in the ACS and candidate base stations 120 that the UE 110 may add to the ACS. For example, at position 504, the ACS at 506 includes the base stations 121, 122, and 123. As the UE 110 continues to move, at position 508, the UE 110 has deleted base station 121 and base station 122 from the ACS and added base stations 124, 125, and 126, as shown at 510. Continuing along the path 502, the UE 110, at position 512, has deleted the base stations 123 and 124 and added the base station 127, as shown in the ACS at 514.

Figure 6:
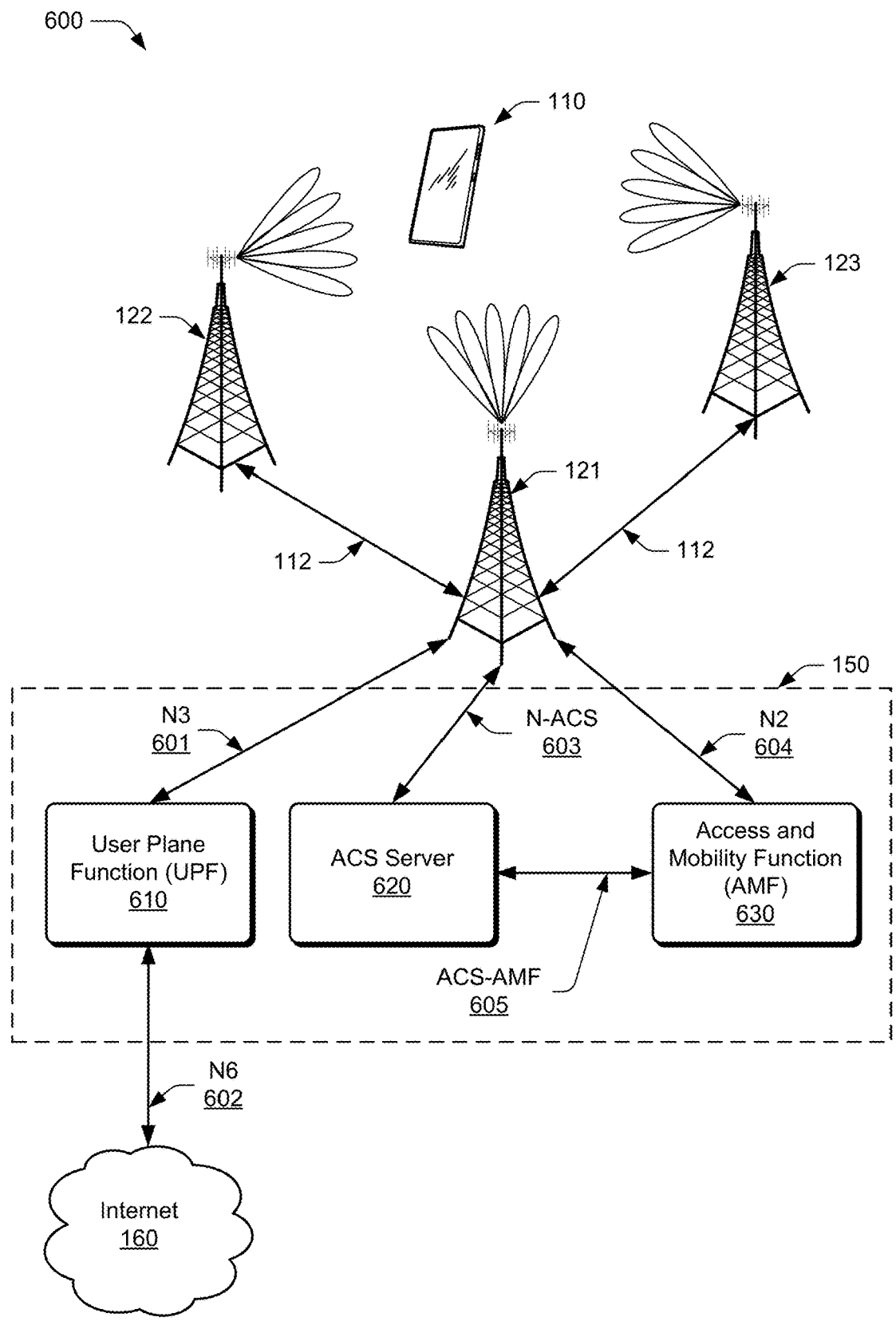
FIG. 6 illustrates an example environment in which various aspects of dynamic carrier subband operation for active coordination sets can be implemented.

FIG. 6 illustrates an example environment 600 in which various aspects of dynamic carrier subband operation for active coordination sets can be implemented. The user equipment 110, while in the engaged mode 422, communicates using joint transmission and/or reception (joint communication, coordinated communication) with the three base stations 121, 122, and 123. The base station 121 is acting as a master base station for the joint transmission and/or reception. Which base station is the master base station is transparent to the UE 110 and the master base station can change as base stations are added and/or removed from the ACS. The master base station coordinates control-plane and user-plane communications for the joint communication with the UE 110, via the Xn interfaces 112 (or a similar 6G interface) to the base stations 122 and 123 and maintains the user-plane context between the UE 110 and the core network 150. The coordination may be performed using proprietary or standards-based messaging, procedures, and/or protocols.

The master base station schedules air interface resources for the joint communication between the UE 110 and the base stations 121, 122, and 123, based on the ACS associated with the UE 110. The master base station (base station 121) connects, via an N3 interface 601 (or a 6G equivalent interface) to the User Plane Function 610 (UPF 610) in the core network 150 for the communication of user-plane data to and from the user equipment 110. The master base station distributes the user-plane data to all the base stations in the joint communication via the Xn interfaces 112. The UPF 610 is further connected to a data network, such as the Internet 160 via the N6 interface 602. All of the base stations 120 in the ACS or any subset of the base stations 120 in the ACS can send downlink data to the UE 110. All of the base stations 120 in the ACS or any subset of the base stations 120 in the ACS can receive uplink data from the UE 110.

When the user equipment 110 creates or modifies an ACS, the user equipment 110 indirectly communicates the created ACS, or the ACS modification, to an ACS Server 620 that stores the ACS for each user equipment 110 operating in the RAN 140. Although shown in the core network 150, alternatively the ACS Server 620 may be an application server located outside the core network 150. The user equipment 110 communicates the ACS or ACS modification via the master base station (base station 121) which is connected to the ACS Server 620 via an N-ACS interface 603. Optionally or alternatively, the user equipment 110 communicates the created ACS or ACS modification to the ACS Server 620 via the Access and Mobility Function 630 (AMF 630) which is connected to the master base station (base station 121) via an N2 interface 604. The AMF 630 relays ACS-related communications to and from the ACS Server 620 via an ACS-AMF interface 605. ACS data between the user equipment 110 and the ACS Server 620 can be communicated via Radio Resource Control (RRC) communications, Non-Access Stratum (NAS) communications, or application-layer communications.

The ACS Server 620 may be implemented as a single network node (e.g., a server). Alternatively, the functionality of the ACS Server 620 may be distributed across multiple network nodes and/or devices and may be distributed in any fashion suitable to perform the functions described herein. The ACS Server 620 includes processor(s) and computer-readable storage media. The processor may be a single core processor, or a multiple core processor composed of a variety of materials, such as silicon, polysilicon, high-K dielectric, copper, and so on. CRM may include any suitable memory or storage device such as random-access memory (RAM), static RAM (SRAM), dynamic RAM (DRAM), non-volatile RAM (NVRAM), read-only memory (ROM), hard disk drives, or Flash memory useful to ACS and related data. The CRM includes applications and/or an operating system of the ACS Server 620, which are executable by the processor(s) to enable communication with the user equipment 110, the master base station 121, and the AMF 630. The ACS Server 620 includes one or more network interfaces for communication with the master base station 121, the AMF 630, and other devices in the core network 150, the user equipment 110, and/or devices in the RAN 140.

Whenever the ACS content changes for any particular user equipment 110, the ACS Server 620 sends a copy of the modified ACS to the master base station (base station 121) for that UE. The master base station uses the ACS to schedule air interface resources for joint communication with the user equipment 110. For example, when a new base station is added to the ACS or an existing base station in the ACS is deleted, the master base station allocates air interface resources for the new base station to participate in the joint communication or deallocates resources for the deleted base station. The master base station relays user-plane data based on the ACS received from the ACS Server 620. Continuing with the example, the master base station starts routing user-plane data to the new base station added to the ACS or terminates relaying data to the existing base station that was removed from the ACS.

In aspects, the initial ACS for the user equipment 110 can be established by the UE 110 during or after the UE 110 performs the attach procedure to connect to the RAN 140. For example, the UE 110 can initialize the ACS with the base stations 120 included in the neighbor relation table of the base station through which the UE 110 attaches to the RAN 140. In another example, the UE 110 considers the base stations 120 included in the neighbor relation table as candidates for the ACS and the measures the link quality of each candidate base station before adding a candidate base station to the ACS. In a further example, the user equipment 110 queries the ACS Server 620 for the last ACS used by the user equipment 110. The UE 110 then validates the entries in the last-used ACS to determine which, if any, entries of the last-used ACS are usable for communication and inclusion in the ACS. In another example, the UE 110, measures the link quality of any base stations 120 from the previous ACS that are within communication range and populates the ACS with one or more of the base stations 120 that exceed a threshold for inclusion (e.g., above a threshold for a Received Signal Strength Indicator (RSSI), a Reference Signal Received Power (RSRP), or a Reference Signal Received Quality (RSRQ)).

The user equipment 110 adds or deletes a base station 120 from the ACS by sending an ACS modification message to the ACS Server 620. The ACS modification message includes an identifier for a base station to add or delete from the ACS along with and indicator to either add or delete the identified base station. Optionally, or additionally, the ACS modification message may include identifiers of multiple base stations with corresponding add/delete indicators for each base station. Other information useful to the management of the ACS may be stored in or with the ACS, such as timestamps for entries in the ACS, geographic location information from the UE, a UE identifier, identification information for the current master base stations, and the like.

The ACS Server 620 receives the ACS modification message from the UE 110 (via the current master base station) and performs the requested modification to an ACS record for the UE 110 that is stored by the ACS Server 620. After receiving the ACS modification message, the ACS Server 620 sends a modified copy of the ACS for the UE 110 to the master base station (base station 121) via the N-ACS interface 603. Optionally or alternatively, the ACS Server 620 may send only the modification of the ACS to the master base station which causes the master base station to update its copy of the ACS. The joint communication scheduler 268 in the master base station uses the updated or modified ACS to modify the scheduling of resources and joint communications for the base stations 120 in the ACS. The master base station can perform real-time scheduling of resources within the ACS of the user equipment 110 to respond to changing channel conditions or communication requirements with low latency requirements.

ACS Subband Operation

In aspects, in addition to the UE 110 creating and maintaining an ACS based on link quality at the location of the UE 110 as described above with respect to FIG. 5, the UE can create, use, and maintain multiple ACSs, based on various factors. For example, the UE 110 can create, maintain, and use multiple ACSs for different frequency bands of operation, for control-plane and user-plane communications, for engaged-mode and disengaged-mode operation, for Time Division Duplex (TDD) and Frequency Domain Duplex (FDD) operation, or the like.

Figure 7:
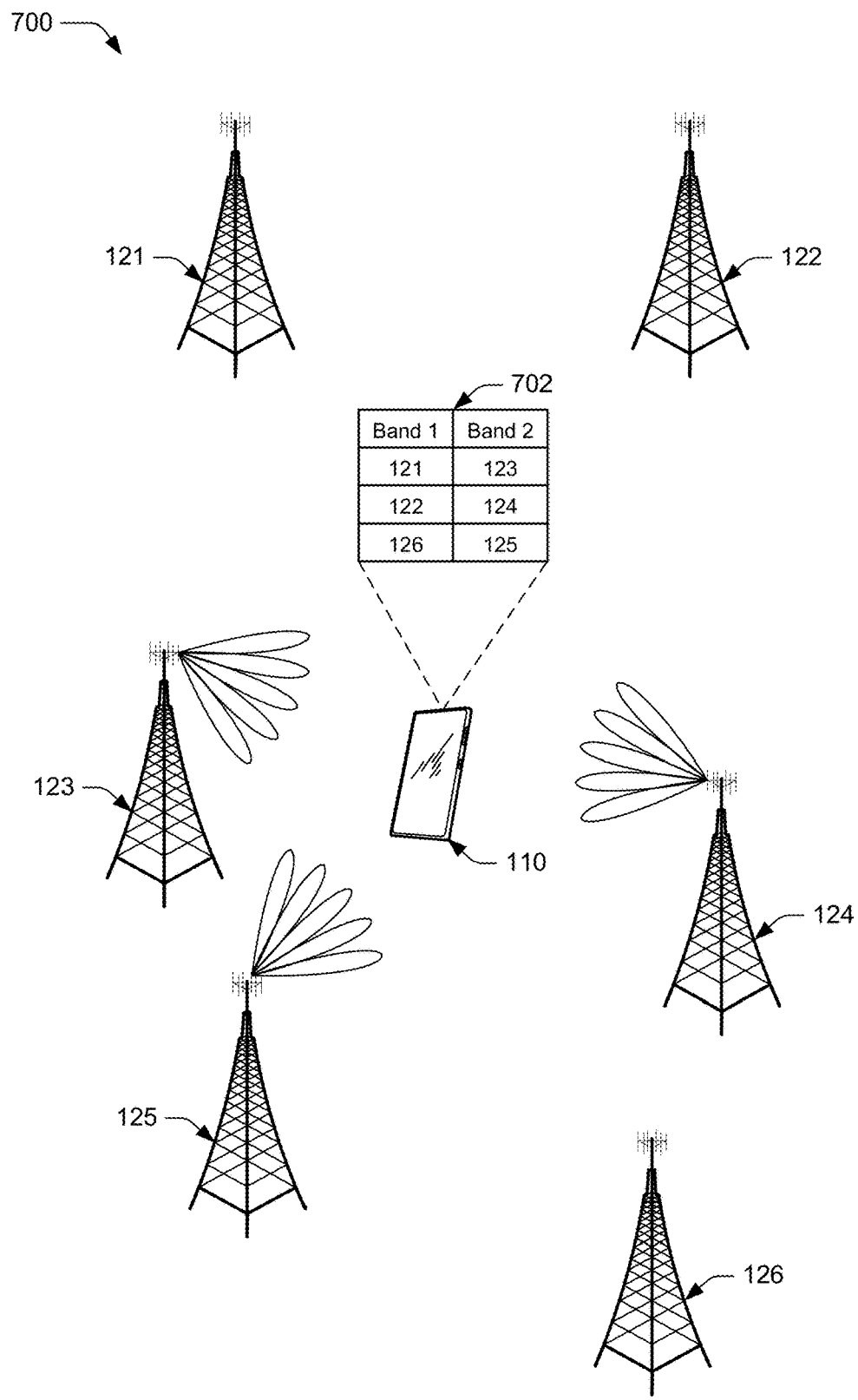
FIG. 7 illustrates an example environment 700 in which a user equipment maintains multiple ACSs for different frequency bands in accordance with aspects of the techniques described herein.

FIG. 7 illustrates an example environment 700 in which a user equipment 110 maintains multiple ACSs for different frequency bands. In an aspect, the UE 110 maintains ACSs for wireless communication in different frequency bands supported by the RAN 140.

For example, the base stations 121, 122, and 126 operate in a first frequency band, such as the sub-gigahertz band or the sub-6 GHz band, and base stations 123, 124, and 125 operate in the above 6 GHz band, such as the mmWave frequency band. The UE 110 maintains two ACSs shown at 702. At the current location of the UE 110, the UE 110 has included the base stations 121, 122, and 126 in a "Band 1" ACS for communications between the UE 110 and the RAN 140 in the first frequency band, such as the sub-gigahertz band. The UE 110 has also included the base stations 123, 124, and 125 in a "Band 2" ACS for communications between the UE 110 and the RAN 140 in the second frequency band, such as the above 6 GHz band. Although two ACSs are illustrated in FIG. 7, the UE 110 can create, maintain, and use any suitable number of ACSs based on frequency bands or subbands within a frequency band.

Figure 8:
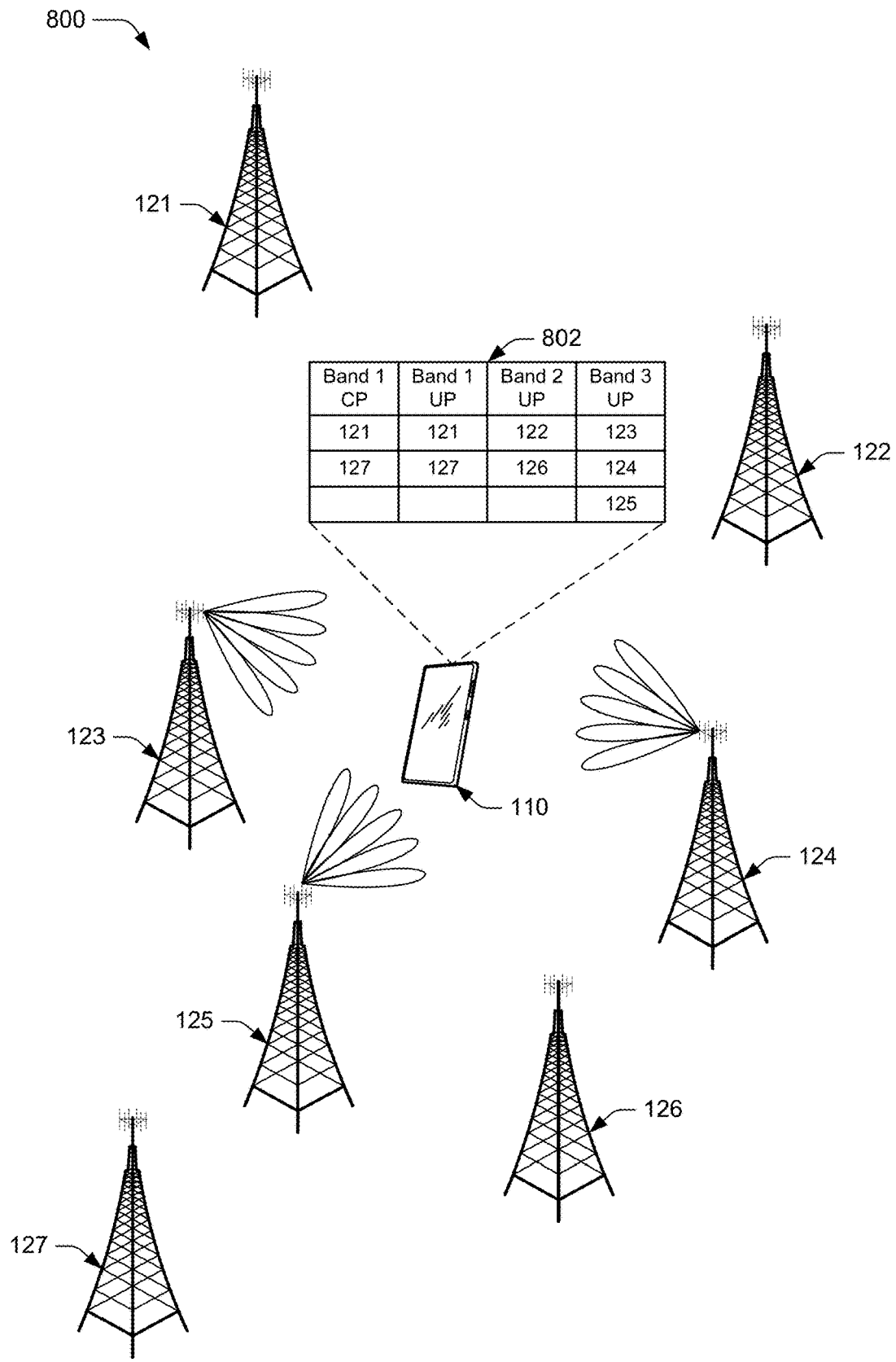
FIG. 8 illustrates an example environment 800 in which a user equipment maintains multiple ACSs for control-plane and user-plane communications in accordance with aspects of the techniques described herein.

FIG. 8 illustrates an example environment 800 in which a user equipment 110 maintains multiple ACSs for control-plane and user-plane communications. In an aspect, the UE 110 maintains ACSs for control-plane and user-plane communications in different frequency bands or subbands supported by the RAN 140.

For example, the base stations 121 and 127 operate in a first frequency band, such as the sub-gigahertz band, with radio propagation characteristics that support wireless communication over longer geographic distances between the UE 110 and the base stations 121 and 127. The base stations 122 and 126 operate in the sub-6 GHz band that supports higher data throughput than the sub-GHz band but over shorter distances. The base stations 123, 124, and 125 operate in the above 6 GHz band, such as the mmWave frequency band, with even higher data throughput but over even shorter distances.

Continuing with the example, the UE 110 has created four ACSs shown at 802. At the current location of the UE 110, the UE 110 has included the base stations 121 and 127 in a first ("Band 1 CP") ACS for control-plane communications that require relatively lower bandwidths and benefit from the higher link budget in the sub-GHz band to improve reliability of control-plane communications for the UE 110. The UE 110 can use the first ACS for control-plane signaling related to user-plane communication in the sub-GHz band or in relation to user-plane communication in any combination of bands used by the UE 110.

The UE 110 has created the three remaining ACSs at 802 for user-plane communication. The UE 110 created the second ("Band 1 UP") ACS for user-plane communication in the sub-GHz band, the third ("Band 2 UP") ACS for user-plane communication in the sub-6 GHz band, the fourth, ("Band 3 UP") ACS for user-plane communication in the above-GHz band. Although four ACSs are illustrated in FIG. 8, the UE 110 can create, maintain, and use any suitable number of ACSs for control-plane and user-plane communication, based on frequency bands or subbands within a frequency band.

Figure 9:
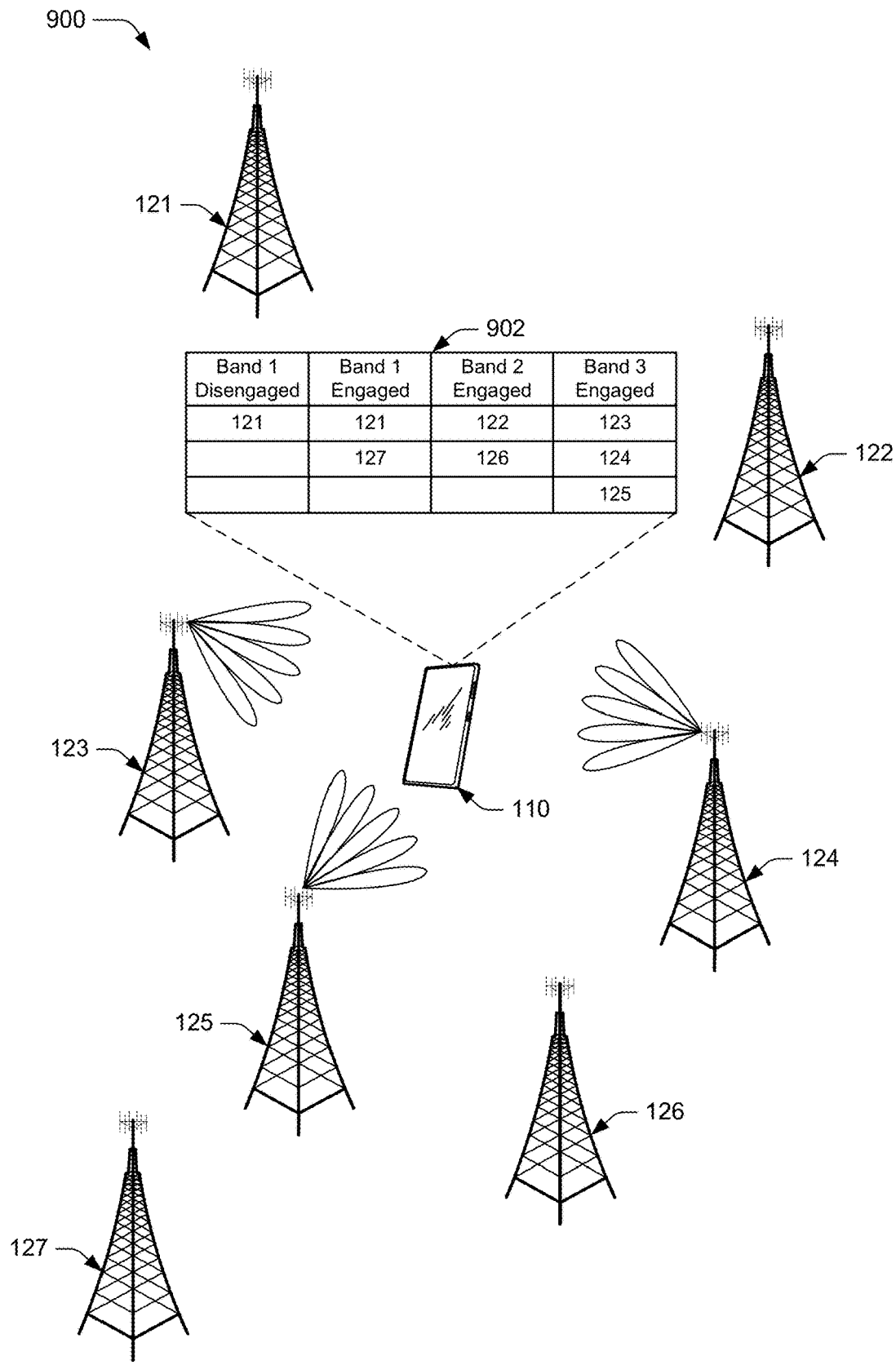
FIG. 9 illustrates an example environment 900 in which a user equipment maintains multiple ACSs based on resource control states of the UE in accordance with aspects of the techniques described herein.

FIG. 9 illustrates an example environment 900 in which a user equipment 110 maintains multiple ACSs based on resource control states of the UE 110. In an aspect, the UE 110 maintains ACSs for engaged mode 422 and disengaged mode 424 operation in different frequency bands or subbands supported by the RAN 140.

For example, the base stations 121 and 127 operate in a first frequency band, such as the sub-gigahertz band, with radio propagation characteristics that support wireless communication over longer geographic distances between the UE 110 and the base stations 121 and 127. The base stations 122 and 126 operate in the sub-6 GHz band that supports higher data throughput than the sub-GHz band but over shorter distances. The base stations 123, 124, and 125 operate in the above-6 GHz band, such as the mmWave frequency band, with even higher data throughput but over even shorter distances.

Continuing with the example, the UE 110 has created four ACSs shown at 902. At the current location of the UE 110, the UE 110 has included the base station 121 in a first ("Band 1 Disengaged") ACS for communication when the UE 110 is the disengaged mode 424. The UE 110 can reduce power consumption in the disengaged mode 424 by communicating in the sub-GHz band. The UE 110 has created the three remaining ACSs at 902 for communication in the engaged mode 422. The UE 110 created the second ("Band 1 Engaged") ACS for communication in the engaged mode 422 in the sub-GHz band, the third ("Band 2 Engaged") ACS for communication in the engaged mode 422 in the sub-6 GHz band, the fourth, ("Band 3 Engaged") ACS for communication in the engaged mode 422 in the above-6 GHz band. Although four ACSs are illustrated in FIG. 9, the UE 110 can create, maintain, and use any suitable number of ACSs for communications in various resource control states, based on frequency bands or subbands within a frequency band.

As discussed above with respect to FIG. 6, the master base station coordinates control-plane and user-plane communications for communication between the base stations in the ACS and the UE 110. In one aspect, the coordination by the master base station can also include coordination of carrier subband operation for the UE. The master base station receives UE capability information from the UE (e.g., such as through RRC signaling when the UE 110 attaches to the RAN 140) that the master base station uses to coordinate carrier subband operation of the base stations in the ACS and the UE. Based on the UE capability information, the master base station can coordinate which subband and/or subband bandwidth part to use for communication, which numerology to use, what bandwidth to use, when a selected carrier subband configuration is activated and/or deactivated, or the like. Alternatively, the coordination of carrier subband operations for the UE, as described herein, can be performed by the ACS Server 620, for example, by including features of the joint communication scheduler 268 in the ACS Server 620.

In another aspect, the master base station can coordinate carrier subband operation based on operational characteristics of current and/or historic communications with the UE. The master base station can determine a configuration for carrier subband operation based on an amount of data currently buffered for transmission to the UE 110, a buffer status of data pending at the UE 110 for transmission, a history of recent DL and/or UL data communicated between the UE 110 and the RAN 140, or the like. For example, the master base station 121 determines that there is an amount of data (e.g., an amount of data that exceeds a threshold value) for DL transmission to the UE 110. Based on the ACS associated with the UE 110, the master base station 121 can configure the base stations 120 in the ACS to transmit using a wider channel bandwidth that supports a higher data rate in a first frequency band, or the master base station 120 can configure the base stations 120 in the currently-used ACS or in a different ACS associated with the UE 110 to transmit in a different frequency band that supports higher data rates.

The master base station can also combine an operational characteristic with the UE capability information to coordinate carrier subband operation. For example, the master base station 121 determines from the UE capability information that the UE 110 supports wider channel bandwidths in the above-6 GHz band (e.g., a 100 MHz channel bandwidth) compared to a narrower channel bandwidth in a lower frequency band (e.g., a 1 MHz or a 10 MHz channel bandwidth). Based on the operational characteristic of a large amount of DL data to transmit to the UE 110 and the UE capability information, the master base station 121 determines to configure base stations in an above-6 GHz band ACS of the UE 110 to transmit the DL data to the UE 110.

In a further aspect, the master base station can coordinate carrier subband operation based on a request from the UE 110. The request from the UE 110 can be based on a status of the UE 110. For example, the UE 110 determines that a power status (e.g., a low battery capacity) or a thermal characteristic (e.g., an overheating condition) can be mitigated by changing the ACS(s) currently in use. The master base station coordinates with the base stations 120 to terminate communication in a frequency band (e.g., a band with higher power consumption), to reduce a channel bandwidth (e.g., to a bandwidth that has a lower power consumption for the UE), to change to a modulation and coding scheme (MCS) that reduces power consumption for the UE, or a combination of these. In a similar aspect, another request from the UE may indicate that another change in status of the UE (e.g., the UE is connected to a charger or the UE overheating condition has been mitigated) now enables the UE to operate using an ACS configuration that consumes more power and/or produces more heat. The master base station can then coordinate with the base stations 120 to configure subband operation based on the change in UE status.

As discussed above, the UE 110 can be associated with different ACSs that include different sets of base stations 120. In another aspect, the UE 110 can operate using different carrier subbands from different ACSs. The UE and the base stations can use the different carrier subbands independently or cooperatively for communication between the RAN and the UE. The different carrier subbands can be in the same band-class or different band-classes (e.g., the sub-gigahertz band-class, the sub-6 GHz band class, or the above 6 GHz band class). For example, a first carrier subband associated with a first ACS (e.g., an ACS in the sub-gigahertz band) is used to communicate control-plane signaling for a second carrier subband associated with a second ACS (e.g., an ACS used for user-plane communication in the sub-6 GHz or the above 6 GHz band). In another example, DL data is transmitted using a first carrier subband associated with a first ACS, and acknowledgements for the DL data are transmitted in a second carrier subband associated with a second ACS.

In another aspect, UL and DL communications can use different carrier subbands, each of which is associated with a different ACS. A master base station for UL communication coordinates with the master base station for the DL communication. The master base stations coordinate control-plane signaling, acknowledgements and negative-acknowledgements of communications, and/or ACS management.

In a further aspect, a first ACS (the base stations in the first ACS) can send a carrier-subband switching command to the UE to request that the UE switch to another set of carrier subbands associated with a different ACS(s). For example, the ACS can include the carrier-subband switching command in DL control-plane signaling of the first ACS. The carrier-subband switching command includes control information such as an identifier of the other set of carrier subbands associated with the other ACS, a carrier subband configuration, or a time at which the switch to the different ACS should occur.

In another aspect, the UE 110 can switch from communicating using a single ACS to using another single ACS, switch from communicating using a single ACS to using multiple ACSs, or switch from communicating using multiple ACSs to using a single ACS. Switching between ACSs can be coordinated between master base stations 120 for each of the ACSs using peer-to-peer communication (e.g., using an Xn interface), or a controller, such as an ACS Server 620, can coordinate with the master base stations 120 in the ACSs to direct the switching of the UE 110 between ACSs.

In another aspect, the master base station for a first ACS (or alternatively the ACS Server 620 acting as a controller for the first ACS) can send a request to the UE 110 to perform an update procedure for a second carrier subband associated with a second ACS. For example, the master base station for a sub-GHz ACS or the ACS Server 620 sends an update request to the UE 110 to provide link quality measurements of base stations 120 in a second ACS that is associated with the above-6 GHz band. The link quality measurements include the UE 110 measuring a Received Signal Strength Indicator (RSSI), a Reference Signal Received Power (RSRP), or a Reference Signal Received Quality (RSRQ). Alternatively or additionally, the update request directs the UE 110 to transmit UL sounding signals and/or beam sweeps for measurement by base stations 120 in the second ACS.

Example Methods

Example method 1000 is described with reference to FIG. 10 in accordance with one or more aspects of dynamic carrier subband operation for active coordination sets. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 10:
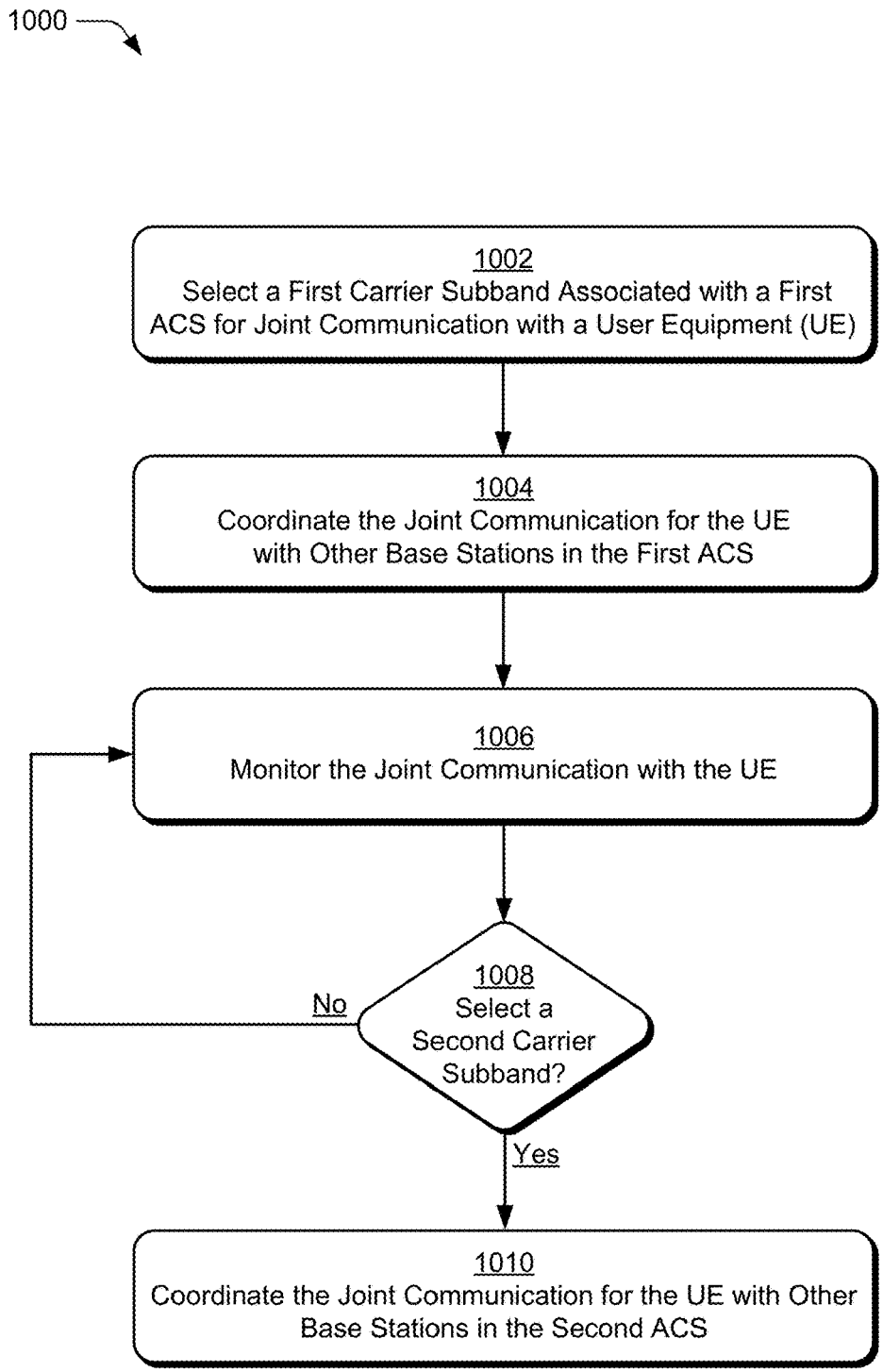
FIG. 10 illustrates an example method of dynamic carrier subband operation for active coordination sets as generally related to the master base station in accordance with aspects of the techniques described herein.

FIG. 10 illustrates example method(s) 1000 of dynamic carrier subband operation for active coordination sets as generally related to the master base station 121. At block 1002, a master base station (e.g., the base station 121) selects a first carrier subband associated with the first ACS for joint communication with UE (e.g., UE 110). For example, the master base station selects the first carrier subband based on one or more factors, such as user equipment capability information, an amount of data to communicate to the UE 110, a user-equipment state, a request from the UE 110, or the like.

At block 1004, the master base station coordinates the joint communication for the UE with other base stations in the first ACS. For example, the master base station communicates with other base stations in the first ACS to allocate resources for the joint communication, and/or forward user-plane data, and/or forward control-plane signaling to the other base stations, or the like. The joint communication includes using the first carrier subband selected at block 1004 for communication (e.g., coordinated multipoint communication) between the UE and a plurality of base stations in the first ACS. The joint communication may include any of uplink communication, downlink communication, or both.

At block 1006, the master base station monitors the joint communication with the UE. For example, the master base station monitors data traffic between the base stations in the first ACS and the UE by evaluating parameters such as data throughput, UE buffer status, buffered downlink data for the UE, RRC signaling from the UE, or the like, to monitor the status of the joint communication.

At block 1008, based on monitoring the joint communication, the master base station determines whether to select a second carrier subband for joint communication with the UE. For example, the master base station evaluates monitored parameters to determine whether to select the second carrier subband, such as a monitored parameter exceeding a threshold value or receiving a request from the UE to select the second carrier subband. If the master base station determines not to select a second carrier subband for the UE, the master base station continues to monitor the joint communication at block 1006.

At block 1010, based on determining to select the second carrier subband at block 1008, the master base station coordinates the joint communication for the UE with other base stations in the second ACS. For example, the master base station communicates with other base stations in the second ACS to allocate resources for the joint communication, and/or forward user-plane data, and/or forward control-plane signaling to the other base stations, or the like. The joint communication includes using the second carrier subband selected at block 1008 for communication (e.g., coordinated multipoint communication) between the UE and a plurality of base stations in the second ACS. The joint communication may include any of uplink communication, downlink communication, or both. The UE may use the second carrier subband to communicate with the base stations in the second ACS at the same time as using the first carrier subband to communicate with base stations in the first ACS. Alternatively, the UE may terminate communication with base stations in the first ACS when using communicating with the base stations in the second ACS.

In the following text some examples are described:

Example 1: A method for coordinating joint communication with a user equipment (UE) by a master base station of a first Active Coordination Set (ACS), the method comprising:

selecting, by the master base station, a first carrier subband associated with the first ACS for joint communication with the UE;

coordinating the joint communication for the UE with other base stations in the first ACS using the first carrier subband;

monitoring the joint communication with the UE;

based on the monitoring the joint communication, selecting a second carrier subband, associated with a second ACS, for the joint communication with the UE; and coordinating with base stations associated with the second ACS to jointly communicate with the UE using the second carrier subband.

Example 2: The method of example 1, wherein monitoring the joint communication comprises:

determining, by the master base station, an amount of buffered data for communication between the base stations in the first ACS and the UE; and wherein based on the monitoring the joint communication, selecting the second carrier subband comprises:

based on the amount of buffered data exceeding a first threshold, selecting the second carrier subband to provide a wider channel bandwidth for the joint communication.

Example 3: The method of example 1 or example 2, wherein monitoring the joint communication comprises:

monitoring data traffic between the base stations in the first ACS and the UE, the method further comprising:

determining, by the master base station, an amount of downlink data for communication between the base stations in the first ACS and the UE; and based on the amount of downlink data exceeding a second threshold, selecting the second carrier subband for transmission of the downlink data to the UE.

Example 4: The method of example 3, wherein uplink data is communicated using the first ACS, and wherein uplink control-plane signaling for the downlink data transmitted is communicated using the second ACS.

Example 5: The method of any of the preceding examples, further comprising:

receiving, by the master base station, UE capability information from the UE, wherein selecting the first carrier subband or selecting the second carrier subband is based at least in part on the UE capability information received from the UE.

Example 6: The method of any of the preceding examples, wherein monitoring the joint communication comprises:

monitoring control-plane signaling for a request from the UE to change carrier subbands based on a status of the UE, the method further comprising:

determining, by the master base station, that the request from the UE indicates that the UE requests to change carrier subbands to assist in mitigating a condition related to the status of the UE; and wherein based on the monitoring the joint communication, selecting the second carrier subband comprises:

based on the UE request, selecting the second carrier subband to mitigate the condition.

Example 7: The method of example 6, wherein the selecting the second carrier subband terminates communication between the UE and the base stations in the first ACS on the first carrier subband.

Example 8: The method of example 6 or example 7, wherein the condition is a low battery capacity of the UE or an overheating condition of the UE, and wherein the master base station selects a second carrier subband with a lower radio frequency, a narrower channel bandwidth, or both.

Example 9: The method of any of examples 6 to 8, further comprising:

receiving an additional request message from the UE, the additional request indicating that the condition has been mitigated; and based on the additional request message, reverting to the first carrier subband for joint communication with the UE, wherein the reverting to the first carrier subband terminates the joint communication using the second carrier subband.

Example 10: The method of any of the preceding examples, wherein monitoring the joint communication comprises:

monitoring a user-equipment state of the UE, the method further comprising:

determining, by the master base station, that user-equipment state is in a disengaged mode; and wherein based on the monitoring the joint communication, selecting the second carrier subband comprises:

based on the user-equipment state being in the disengaged mode, selecting the second carrier subband to correspond to a second ACS that is associated with operation of the UE in the disengaged mode.

Example 11: The method of any of the preceding examples, wherein the joint communication using the first ACS is a joint transmission, a joint reception, or a joint transmission and joint reception between the UE and the base stations included in the first ACS, and wherein the joint communication using the second ACS is a joint transmission, a joint reception, or a joint transmission and joint reception between the UE and the base stations included in the second ACS.

Example 12: The method of any of the preceding examples, wherein control-plane signaling is communicated using the first ACS and user-plane data is communicated using the second ACS.

Example 13: The method of any of the preceding examples, wherein a second base station is a master base station for the second ACS, and wherein coordinating the joint communication using the first ACS on the first carrier subband and using the second ACS on the second carrier subband is coordinated by the master base station and the second base station using an Xn interface between the master base station and the second base station.

Example 14: The method of any of the preceding examples, wherein a second base station is a master base station for the second ACS, and wherein the coordinating the joint communication using the first ACS on the first carrier subband and using the second ACS on the second carrier subband is coordinated by an ACS Server.

Example 15: A network device for coordinating joint communication with a user equipment (UE) using one or more Active Coordination Sets (ACS), the network device comprising:

a processor and memory system to implement a joint communication scheduler application configured to:

select a first carrier subband associated with a first ACS for a joint communication with a user equipment (UE);

coordinate, using the network interface, the joint communication for the UE with base stations in the first ACS using the first carrier subband;

monitor one or more parameters related to the joint communication with the UE;

based on the monitoring of the one or more parameters related to the joint communication, select a second carrier subband, associated with a second ACS, for the joint communication with the UE;

coordinate with base stations associated with the second ACS to jointly communicate with the UE using the second carrier subband.

Example 16: The network device of example 15, wherein the joint communication scheduler application is configured to:

determine an amount of buffered data for communication between the base stations in the first ACS and the UE; and wherein the second carrier subband selection is based on the amount of buffered data exceeding a first threshold.

Example 17: The network device of example 15 or example 16, wherein the monitoring of the one or more parameters related to the joint communication comprises the monitoring of the data traffic between the base stations in the first ACS and the UE, and wherein the joint communication scheduler application is configured to:

determine an amount of downlink data for communication between the base stations in the first ACS and the UE; and based on the amount of downlink data exceeding a second threshold, select the second carrier subband for transmission of the downlink data to the UE.

Example 18: The network device of any of examples 15 to 17, wherein the joint communication scheduler application is configured to:

receive UE capability information from the UE, wherein the selection of the first carrier subband or the selection of the second carrier subband is based at least in part on the UE capability information received from the UE.

Example 19: The network device of any of examples 15 to 18, wherein the monitoring of the one or more parameters related to the joint communication comprises receiving a request from the UE to change carrier subbands based on a status of a condition of the UE, and wherein the second carrier subband selection comprises:
based on the UE request, select the second carrier subband to assist the UE to mitigate the condition.

Example 20: The network device of example 19, wherein the condition is a low battery capacity of the UE or an overheating condition of the UE, and wherein the master base station selects a second carrier subband with a lower radio frequency, a narrower channel bandwidth, or both.

Example 21: The network device of any of examples 15 to 20, wherein the network device is a base station configured as a master base station for coordinating the joint communication, the network device comprising:
one or more radio transceivers coupled to the processor and memory system; and
an Xn interface;
wherein the joint communication scheduler application is configured to:
 directly monitor the one or more parameters related to the joint communication with the UE using the one or more radio transceivers;
 indirectly monitor the one or more parameters related to the joint communication with the UE using the Xn interface; or
 directly monitor the one or more parameters related to the joint communication with the UE using the one or more radio transceivers and indirectly monitor the one or more parameters related to the joint communication with the UE using the Xn interface.

Example 22: The network device of any of examples 15 to 21, wherein the network device is an ACS Server configured for coordinating the joint communication, the network device comprising:
a network interface configured for communication with an Access and Mobility Function (AMF) or base stations in the first and second ACSs;
wherein the joint communication scheduler application configured to:
indirectly monitor the one or more parameters related to the joint communication with the UE using the network interface.

Example 23: A processor-readable medium comprising instructions which, when executed by one or more processors, cause a device including the one or more processors to perform the method of any of examples 1 to 14.

Example 24: A network device for coordinating joint communication with a user equipment (UE) using one or more Active Coordination Sets (ACS), the network device comprising:
a processor and memory system to implement a joint communication scheduler application configured to perform any one of examples 1 to 14.

Although aspects of dynamic carrier subband operation for active coordination sets have been described in language specific to features and/or methods, the subject of the appended claims is not necessarily limited to the specific features or methods described. Rather, the specific features and methods are disclosed as example implementations of dynamic carrier subband operation for active coordination sets, and other equivalent features and methods are intended to be within the scope of the appended claims. Further, various different aspects are described, and it is to be appreciated that each described aspect can be implemented independently or in connection with one or more other described aspects.

What is claimed is:

1. A method for determining Active Coordination Sets of base stations by a user equipment (UE) for wireless communication between the user equipment and multiple base stations, the method comprising:
evaluating, by the user equipment, a link quality measurement for a first base station and a second base station in a plurality of base stations;
determining, by the UE, a first set of base stations, including the first base station and the second base station from the plurality of base stations, to include in a first Active Coordination Set (ACS);
sending a first message to an ACS Server including an indication to add the first set of base stations to the first ACS, the sending being effective to cause the ACS Server to:
 store the first ACS for the user equipment, the stored first ACS including the indication of the first set of base stations; and
 send a copy of the stored first ACS to a master base station included in the first ACS;
jointly-communicating with the first set of base stations in the first ACS;
determining, by the user equipment, that a base station in the first ACS is below a minimum link quality threshold;
adding, to the first ACS, a third base station from the plurality of base stations;
determining, by the UE, a second set of base stations from the plurality of base stations to include in a second ACS, the second ACS including a different set of base stations relative to the first ACS;
sending a second message to the ACS Server including an indication to delete from the first ACS the base station that is below the minimum link quality threshold, the sending being effective to cause the ACS Server to:
 update the stored copy as the second ACS to remove the indicated base station from the ACS;
 store the updated copy of the stored second ACS; and
 send the updated copy of the first ACS to the master base station included in the second ACS; and
jointly-communicating with the second set of base stations in the second ACS.

2. The method of claim 1, wherein the jointly-communicating with the first set of base stations in the first ACS, by the user equipment, comprises:
jointly-receiving, by the user equipment, downlink user-plane data from the first set of base stations in the first ACS;
jointly-transmitting, by the user equipment, uplink user-plane data to the first set of base stations in the first ACS; or
both the jointly-receiving the downlink user-plane data and the jointly-transmitting the uplink user-plane data with the first set of base stations in the first ACS.

3. The method of claim 1, wherein the evaluating, by the user equipment, comprises:
receiving, by the user equipment, downlink radio frequency (RF) signals from each of the plurality of base stations;
measuring a link quality parameter of each of the downlink RF signals; and
comparing each of the measured link quality parameters to a minimum link quality threshold.

4. The method of claim 3, wherein the determining the first set of base stations comprises:
determining to add to the first ACS any of the base stations with a measured link quality parameter that exceeds the minimum link quality threshold.

5. The method of claim 3, wherein the link quality parameter is:
a Received Signal Strength Indicator (RSSI);
a Reference Signal Received Power (RSRP); or
a Reference Signal Received Quality (RSRQ).

6. The method of claim 1, wherein the sending a message to the ACS Server comprises:
sending the message using a Radio Resource Control (RRC) communication, a Non-Access Stratum (NAS) communication, or an application-layer communication.

7. The method of claim 1,
wherein the determining the first set of base stations to include in the first ACS comprises:
determining the first set of base stations for communication in a first carrier subband; and
wherein the determining the second set of base stations from the plurality of base stations to include in the second ACS comprises:
determining the second set of base stations for communication in a second carrier subband.

8. The method of claim 7, wherein uplink data is communicated using the first ACS, and wherein uplink control-plane signaling for downlink data transmitted is communicated using the second ACS.

9. The method of claim 7, further comprising:
transmitting, by the UE, UE capability information, the transmitting directing a master base station to select the first carrier subband or select the second carrier subband based at least in part on the UE capability information.

10. The method of claim 1, wherein the jointly-communicating with the second set of base stations in the second ACS, by the user equipment, comprises:
jointly-receiving, by the user equipment, downlink user-plane data from the second set of base stations in the second ACS;
jointly-transmitting, by the user equipment, uplink user-plane data to the second set of base stations in the second ACS; or
both the jointly-receiving the downlink user-plane data and the jointly-transmitting the uplink user-plane data with the second set of base stations in the second ACS.

11. The method of claim 1, wherein the determining the second set of base stations comprises:
determining to add to the second ACS any of the base stations with a measured link quality parameter that exceeds the minimum link quality threshold.

12. The method of claim 11, further comprising:
sending a third message to an ACS Server including an indication to add the second set of base stations to the second ACS, the message being effective to cause the ACS Server to:
store the second ACS for the user equipment, the stored second ACS including the indication of the second set of base stations; and
send a copy of the stored second ACS to a master base station.

13. The method of claim 12, further comprising:
determining, by the user equipment, that a base station in the second ACS is below a minimum link quality threshold;
sending a fourth message to the ACS Server including an indication to delete from the second ACS the base station that is below the minimum link quality threshold, the sending being effective to cause the ACS Server to:
update the stored copy of the second ACS to remove the indicated base station from the ACS;
store the updated copy of the second ACS; and
send the updated copy of the second ACS to the master base station.

14. The method of claim 1, wherein the first set of base stations intersects with the second set of base stations.

15. A user equipment (UE), comprising:
a processor; and
memory comprising instructions executable by the processor to cause the UE to:
evaluate a link quality measurement for a first base station and a second base station in a plurality of base stations;
determine a first set of base stations, including the first base station and the second base station from the plurality of base stations, to include in a first Active Coordination Set (ACS);
send a first message to an ACS Server including an indication to add the first set of base stations to the first ACS, the sending being effective to cause the ACS Server to:
store the first ACS for the user equipment, the stored first ACS including the indication of the first set of base stations; and
send a copy of the stored first ACS to a master base station included in the first ACS;
jointly-communicate with the first set of base stations in the first ACS;
determine that a base station in the first ACS is below a minimum link quality threshold;
add, to the first ACS, a third base station from the plurality of base stations;
determine a second set of base stations from the plurality of base stations to include in a second ACS, the second ACS including a different set of base stations relative to the first ACS;
send a second message to the ACS Server including an indication to delete from the first ACS the base station that is below the minimum link quality threshold, the sending being effective to cause the ACS Server to:
update the stored copy as the second ACS to remove the indicated base station from the ACS;
store the updated copy of the stored second ACS; and
send the updated copy of the first ACS to the master base station included in the second ACS; and
jointly-communicate with the second set of base stations in the second ACS.

16. The user equipment of claim 15, wherein the instructions to jointly-communicate with the first set of base stations in the first ACS further configure the user equipment to:

jointly-receive downlink user-plane data from the first set of base stations in the first ACS;

jointly-transmit uplink user-plane data to the first set of base stations in the first ACS; or both the jointly-receive the downlink user-plane data and the jointly-transmit the uplink user-plane data with the first set of base stations in the first ACS.

17. The user equipment of claim 15, wherein the instructions to evaluate the link quality measurement for each base station configure the user equipment to:

receive downlink radio frequency, RF, signals from each of the plurality of base stations;

measure a link quality parameter of each of the downlink RF signals; and compare each of the measured link quality parameters to a minimum link quality threshold.

18. The user equipment of claim 17, wherein the instructions to determine the first set of base stations configure the user equipment to:

determine to add to the first ACS any of the base stations with a measured link quality parameter that exceeds the minimum link quality threshold.

19. The user equipment of claim 17, wherein the link quality parameter is:

a Received Signal Strength Indicator (RSSI);

a Reference Signal Received Power (RSRP); or a Reference Signal Received Quality (RSRQ).

20. A method for determining Active Coordination Sets of base stations by a user equipment (UE) for wireless communication between the user equipment and multiple base stations, the method comprising:

evaluating, by the user equipment, a link quality measurement for a first base station and a second base station in a plurality of base stations;

determining, by the UE, a first set of base stations, including the first base station and the second base station from the plurality of base stations, to include in a first Active Coordination Set (ACS);

jointly-communicating with the first set of base stations in the first ACS;

adding, to the first ACS, a third base station from the plurality of base stations;

determining, by the UE, a second set of base stations from the plurality of base stations to include in a second ACS, the second ACS including a different set of base stations relative to the first ACS;

sending a first message to an ACS Server including an indication to add the second set of base stations to the second ACS, the sending being effective to cause the ACS Server to:

store the second ACS for the user equipment, the stored second ACS including the indication of the second set of base stations; and send a copy of the stored second ACS to a master base station; and jointly-communicating with the second set of base stations in the second ACS.

21. The method of claim 20, further comprising:

determining, by the user equipment, that a base station in the second ACS is below a minimum link quality threshold;

sending a second message to the ACS Server including an indication to delete from the second ACS the base station that is below the minimum link quality threshold, the sending being effective to cause the ACS Server to:

update the stored copy of the second ACS to remove the indicated base station from the ACS;

store the updated copy of the second ACS; and send the updated copy of the second ACS to the master base station.

* * * * *